United States Patent
Nakayama et al.

(10) Patent No.: US 9,608,249 B2
(45) Date of Patent: Mar. 28, 2017

(54) BATTERY ASSEMBLY AND METHOD OF SWITCHING CONNECTION IN BATTERY ASSEMBLY

(71) Applicant: TOYOTA JIDOSHA KABUSHIKI KAISHA, Toyota-shi, Aichi-ken (JP)

(72) Inventors: Hiroyuki Nakayama, Okazaki (JP); Reo Eto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 125 days.

(21) Appl. No.: 14/609,048

(22) Filed: Jan. 29, 2015

(65) Prior Publication Data

US 2015/0214532 A1    Jul. 30, 2015

(30) Foreign Application Priority Data

Jan. 30, 2014    (JP) ................ 2014-015480

(51) Int. Cl.
| | | |
|---|---|---|
| *H01M 2/20* | (2006.01) | |
| *H01M 2/22* | (2006.01) | |
| *H01M 10/42* | (2006.01) | |
| *H01M 2/10* | (2006.01) | |

(52) U.S. Cl.
CPC ......... *H01M 2/202* (2013.01); *H01M 2/1077* (2013.01); *H01M 2/206* (2013.01); *H01M 2/22* (2013.01); *H01M 10/4207* (2013.01); *H01M 2220/20* (2013.01)

(58) Field of Classification Search
None
See application file for complete search history.

(56) References Cited

U.S. PATENT DOCUMENTS

2011/0151316 A1*  6/2011  Yoon ............... H01M 2/1077
                                                       429/160

FOREIGN PATENT DOCUMENTS

| JP | 63-15637 A | 1/1988 |
|---|---|---|
| JP | 63-153738 U | 10/1988 |
| JP | 5-137265 A | 6/1993 |
| JP | 9-147826 A | 6/1997 |
| JP | 9-283109 A | 10/1997 |
| JP | 11-234909 A | 8/1999 |
| JP | 2000-308268 A | 11/2000 |
| JP | 2005-166493 A | 6/2005 |
| JP | 2009-289613 A | 12/2009 |
| JP | 2010-57288 A | 3/2010 |
| KR | 20110072272 A | 6/2011 |

OTHER PUBLICATIONS

CN202178595 EN translation and Figures—2012.*

* cited by examiner

*Primary Examiner* — Lucas J. O'Donnell
(74) *Attorney, Agent, or Firm* — Sughrue Mion, PLLC

(57) ABSTRACT

A battery assembly includes a fixed bus bar and a first movable bus bar and a second movable bus bar. The fixed bus bar is connected to any of terminals. The first movable bus bar and the second movable bus bar are movable in directions toward and away from a lid portion of a battery cell. When the first movable bus bar is in contact with the fixed bus bar and the second movable bus bar is in non-contact with the fixed bus bar, a plurality of battery cells are connected in series. When the second movable bus bar is in contact with the fixed bus bar and the first movable bus bar is in non-contact with the fixed bus bar, a plurality of battery cells are connected in parallel.

6 Claims, 18 Drawing Sheets

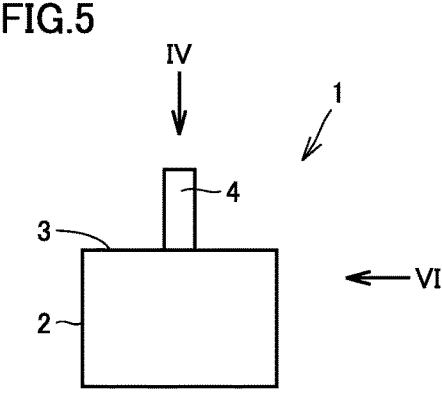
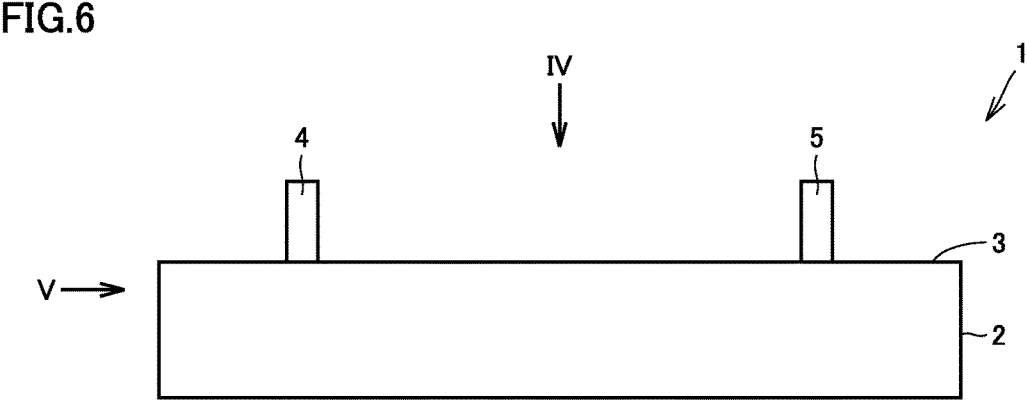

BATTERY ASSEMBLY AND METHOD OF SWITCHING CONNECTION IN BATTERY ASSEMBLY

This nonprovisional application is based on Japanese Patent Application No. 2014-015480 filed with the Japan Patent Office on Jan. 30, 2014, the entire contents of which are hereby incorporated by reference.

BACKGROUND OF THE INVENTION

Field of the Invention

The present invention relates to a battery assembly and a method of switching connection in a battery assembly.

Description of the Background Art

In connection with a conventional battery assembly, Japanese Patent Laying-Open No. 9-147826 has proposed an apparatus for switching between connection in series and connection in parallel among a plurality of installed battery cells by moving a series connecting member and a parallel connecting member with the use of switch drive means. Japanese Patent Laying-Open No. 2005-166493 has proposed an apparatus for switching between connection in series and connection in parallel among a plurality of battery cells by moving a slide conductive plate provided in a battery assembly in front and rear directions so as to switch between a serial connecting position and a parallel connecting position.

With the apparatuses described in the documents above, switching between connection in series and connection in parallel among terminals is made by moving a member in a direction of disposition of a plurality of battery cells. Therefore, a space for movement of a member should be secured and a battery assembly has disadvantageously increased in size.

SUMMARY OF THE INVENTION

The present invention was made in view of the problems described above, and a primary object thereof is to provide a battery assembly allowing space conservation of an apparatus for switching between connection in series and connection in parallel among a plurality of battery cells. Another object of the present invention is to provide a method of switching connection in a battery assembly, for switching between connection in series and connection in parallel among a plurality of battery cells with a space being conserved.

A battery assembly according to the present invention is a battery assembly in which a plurality of battery cells are connected as being switched between connection in series and connection in parallel. The battery cell has a lid portion, and a positive electrode terminal and a negative electrode terminal. The positive electrode terminal and the negative electrode terminal protrude from the lid portion to the outside of the battery cell. The battery assembly includes a fixed bus bar, and a first movable bus bar and a second movable bus bar. The fixed bus bar is connected to any of the positive electrode terminal and the negative electrode terminal. The first movable bus bar and the second movable bus bar are movable in directions toward and away from the lid portion. The plurality of battery cells are connected in series while the first movable bus bar is in contact with the fixed bus bar and the second movable bus bar is in non-contact with the fixed bus bar. The plurality of battery cells are connected in parallel while the second movable bus bar is in contact with the fixed bus bar and the first movable bus bar is in non-contact with the fixed bus bar.

According to the battery assembly thus constructed, by switching between contact and non-contact of the first movable bus bar and the second movable bus bar with the fixed bus bar, the plurality of battery cells can be connected as being switched between connection in series and connection in parallel. Since there is no member moving in a direction of disposition of the battery cells, space conservation of an apparatus for switching between connection in series and connection in parallel among the plurality of battery cells can be achieved.

Preferably, the fixed bus bar has a flat portion in a form of a flat plate and a protruding portion protruding from the flat portion in a direction away from the battery cell. The flat portion can be in contact with the first movable bus bar. The protruding portion can be in contact with the second movable bus bar. According to such a construction, the first movable bus bar and the second movable bus bar can be moved with respect to the lid portion in the same direction so as to switch between contact and non-contact of the first movable bus bar and the second movable bus bar with the fixed bus bar.

Preferably, the first movable bus bar has a first expansion and contraction portion which can expand and contract and a first movable-side contact portion movable in directions toward and away from the fixed bus bar with expansion and contraction of the first expansion and contraction portion. According to such a construction, force of expansion and contraction of the first expansion and contraction portion can be applied to the first movable bus bar, so as to readily switch between contact and non-contact of the first movable bus bar with the fixed bus bar.

Preferably, the first expansion and contraction portion biases the first movable-side contact portion in a direction away from the flat portion. According to such a construction, the first movable bus bar can be brought in contact with the fixed bus bar by applying force in a direction of contraction of the first expansion and contraction portion to the first movable bus bar, and the fixed bus bar and the first movable bus bar can be in non-contact with each other by removing the force.

Preferably, the first expansion and contraction portion is a spring. According to such a construction, the first expansion and contraction portion for moving the first movable-side contact portion can be realized with a simplified construction.

Preferably, the second movable bus bar has a second expansion and contraction portion which can expand and contract and a second movable-side contact portion movable in directions toward and away from the fixed bus bar with expansion and contraction of the second expansion and contraction portion. According to such a construction, contact and non-contact of the second movable bus bar with the fixed bus bar can readily be switched by applying force of expansion and contraction of the second expansion and contraction portion to the second movable bus bar.

Preferably, the second expansion and contraction portion biases the second movable-side contact portion in a direction toward the protruding portion. According to such a construction, the fixed bus bar and the second movable bus bar can be in non-contact with each other by applying force in a direction of contraction of the second expansion and contraction portion to the second movable bus bar, and the second movable bus bar can be brought in contact with the fixed bus bar by removing the force.

Preferably, the second expansion and contraction portion is a spring. According to such a construction, the second expansion and contraction portion for moving the second movable-side contact portion can be realized with a simplified construction.

Preferably, a relational expression of kL>98m is satisfied, where k represents a spring constant of the second expansion and contraction portion, L represents a distance from the second movable-side contact portion to the protruding portion, and m represents a weight of the second movable bus bar. According to such a construction, even when vibration 10 times as great as acceleration of gravity occurs in the battery assembly, contact between the second movable-side contact portion and a second fixed-side contact portion can be maintained. Therefore, unexpected breakage of connection in parallel in the battery assembly can be suppressed.

Preferably, the first movable bus bar and the second movable bus bar are pressed in the direction toward the lid portion by a pressing member. According to such a construction, switching between contact and non-contact of the first movable bus bar and the second movable bus bar with the fixed bus bar can reliably and simultaneously be made.

Preferably, a relational expression of F>196(n−1)M is satisfied, where F represents a load with which the pressing member presses the first movable bus bar and the second movable bus bar, n represents the number of battery cells, and M represents a weight of the first movable bus bar and the second movable bus bar. According to such a construction, even when vibration 10 times as great as acceleration of gravity occurs in the battery assembly, contact between the first movable-side contact portion and a first fixed-side contact portion can be maintained. Therefore, unexpected breakage of connection in series in the battery assembly can be suppressed.

A method of switching connection in a battery assembly according to the present invention is a method for connecting a plurality of battery cells as switching between connection in series and connection in parallel. The battery cell has a lid portion, and a positive electrode terminal and a negative electrode terminal protruding from the lid portion to the outside of the battery cell. The battery assembly includes a fixed bus bar connected to any of the positive electrode terminal and the negative electrode terminal, and a first movable bus bar and a second movable bus bar movable in directions toward and away from the lid portion. The plurality of battery cells are connected in series by bringing the first movable bus bar in contact with the fixed bus bar and not allowing contact of the second movable bus bar with the fixed bus bar. The plurality of battery cells are connected in parallel by bringing the second movable bus bar in contact with the fixed bus bar and not allowing contact of the first movable bus bar with the fixed bus bar.

According to the method of switching connection in a battery assembly thus constructed, by switching between contact and non-contact of the first movable bus bar and the second movable bus bar with the fixed bus bar, the plurality of battery cells can be connected as being switched between connection in series and connection in parallel. Since there is no member moving in a direction of disposition of the battery cells, switching between connection in series and connection in parallel among the plurality of battery cells can be achieved with a space being conserved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a front view of the battery cell.
FIG. 6 is a side view of the battery cell.

DESCRIPTION OF THE PREFERRED EMBODIMENTS

Figure 1:
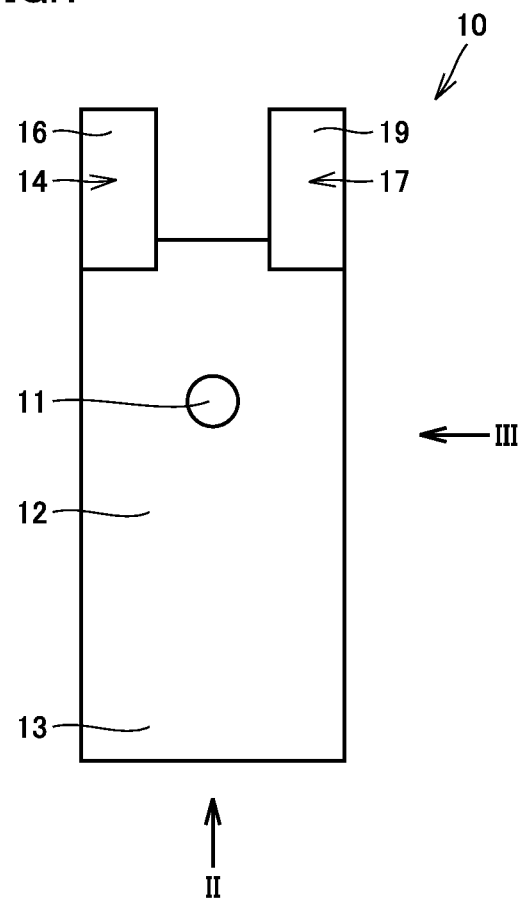
FIG. 1 is a plan view of a fixed bus bar.

An embodiment of this invention will be described hereinafter with reference to the drawings. The same or corresponding elements in the drawings below have the same reference characters allotted and description thereof will not be repeated.

Figure 2:
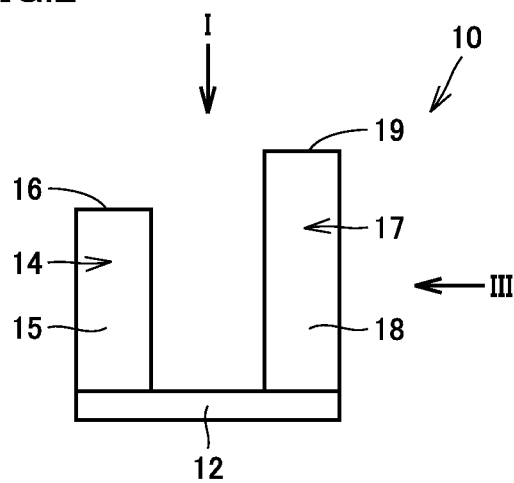
FIG. 2 is a front view of the fixed bus bar.
Figure 3:
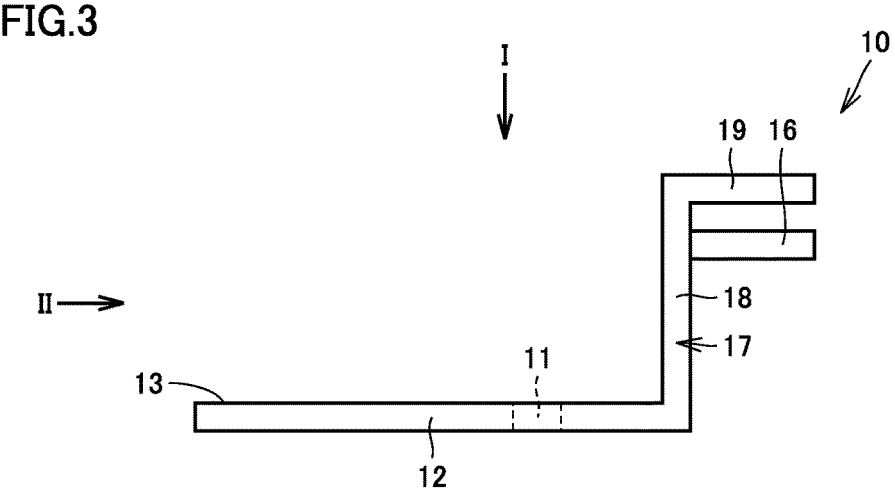
FIG. 3 is a side view of the fixed bus bar.

FIG. 1 is a plan view of a fixed bus bar 10 included in a battery assembly in the present embodiment. FIG. 2 is a front view of fixed bus bar 10 shown in FIG. 1. FIG. 3 is a side view of fixed bus bar 10 shown in FIGS. 1 and 2. FIG. 1 illustrates fixed bus bar 10 viewed in a direction shown with an arrow I shown in FIGS. 2 and 3. FIG. 2 illustrates fixed bus bar 10 viewed in a direction shown with an arrow II shown in FIGS. 1 and 3. FIG. 3 illustrates fixed bus bar 10 viewed in a direction shown with an arrow III shown in FIGS. 1 and 2.

Referring to FIGS. 1 to 3, fixed bus bar 10 has a flat portion 12 in a form of a flat plate. Flat portion 12 is formed in a shape of a rectangular plate. Flat portion 12 has a terminal attachment portion 11 formed. Terminal attachment portion 11 is formed in a shape of a through hole which passes through flat portion 12 in a direction of thickness. A first fixed-side contact portion 13 is formed around one short side of flat portion 12 in a rectangular shape in the plan view. First fixed-side contact portion 13 is provided such that it can be in contact with a first movable bus bar which will be described later.

Fixed bus bar 10 has a plurality of protruding portions 14 and 17 protruding from one surface of flat portion 12. Protruding portions 14 and 17 protrude from flat portion 12, from the other short side of flat portion 12 in the rectangular shape in the plan view, which is opposite to first fixed-side contact portion 13.

Protruding portion 14 has an erected portion 15 and a second fixed-side contact portion 16. Erected portion 15 extends in a direction orthogonal to flat portion 12. Second fixed-side contact portion 16 is provided at a tip end of erected portion 15 and extends in parallel to flat portion 12. Protruding portion 17 has an erected portion 18 and a second fixed-side contact portion 19. Erected portion 18 extends in the direction orthogonal to flat portion 12. Second fixed-side contact portion 19 is provided at a tip end of erected portion 18 and extends in parallel to flat portion 12. Second fixed-side contact portions 16 and 19 are provided such that they can be in contact with a second movable bus bar which will be described later.

A height by which erected portion 15 protrudes from flat portion 12 is different from a height by which erected portion 18 protrudes from flat portion 12. More specifically, a length of extension of erected portion 15 in the direction orthogonal to flat portion 12 is smaller than a length of extension of erected portion 18 in that direction. Second fixed-side contact portions 16 and 19 are arranged at positions different from each other in the direction orthogonal to flat portion 12. Second fixed-side contact portion 16 is arranged at a position closer to flat portion 12 than second fixed-side contact portion 19. Second fixed-side contact portion 19 is arranged at a position farther from flat portion 12 than second fixed-side contact portion 16. Second fixed-side contact portion 16 and second fixed-side contact portion 19 are arranged such that a height difference is created therebetween.

Figure 4:
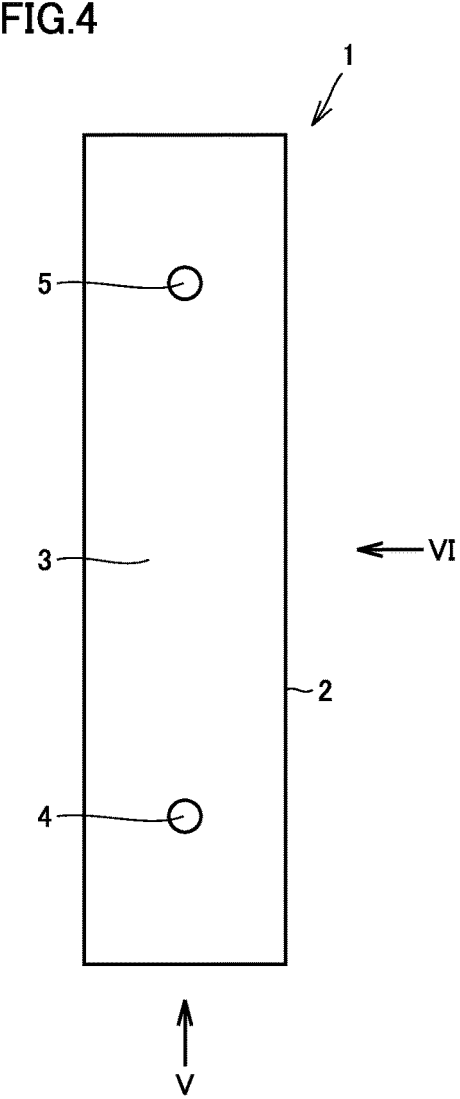
FIG. 4 is a plan view of a battery cell.

FIG. 4 is a plan view of a battery cell 1 included in the battery assembly in the present embodiment. FIG. 5 is a front view of battery cell 1 shown in FIG. 4. FIG. 6 is a side view of battery cell 1 shown in FIGS. 4 and 5. FIG. 4 illustrates battery cell 1 viewed in a direction shown with an arrow IV shown in FIGS. 5 and 6. FIG. 5 illustrates battery cell 1 viewed in a direction shown with an arrow V shown in FIGS. 4 and 6. FIG. 6 illustrates battery cell 1 viewed in a direction shown with an arrow VI shown in FIGS. 4 and 5.

Referring to FIGS. 4 to 6, battery cell 1 has a case 2 and a lid portion 3. Case 2 has a shape substantially like a rectangular parallelepiped which opens in one direction. An electrolytic solution and a battery element which are not shown are accommodated in case 2. Lid portion 3 is in a form of a flat plate having a substantially rectangular plan view. Lid portion 3 is provided to close the opening provided in case 2. As lid portion 3 is attached to case 2, a sealed space surrounded by case 2 and lid portion 3 is delimited. Case 2 and lid portion 3 constitute a housing accommodating a battery element.

Battery cell 1 has terminals 4 and 5. Terminals 4 and 5 are provided outside case 2 as external terminals of battery cell 1. Terminals 4 and 5 extend in a direction orthogonal to lid portion 3 in the form of the flat plate. Terminals 4 and 5 protrude from lid portion 3 to the outside of battery cell 1. Terminals 4 and 5 are electrically connected to the battery element in case 2. One of terminals 4 and 5 is a positive electrode terminal and the other is a negative electrode terminal. Terminals 4 and 5 are provided as a pair of terminals different in polarity from each other.

Figure 7:
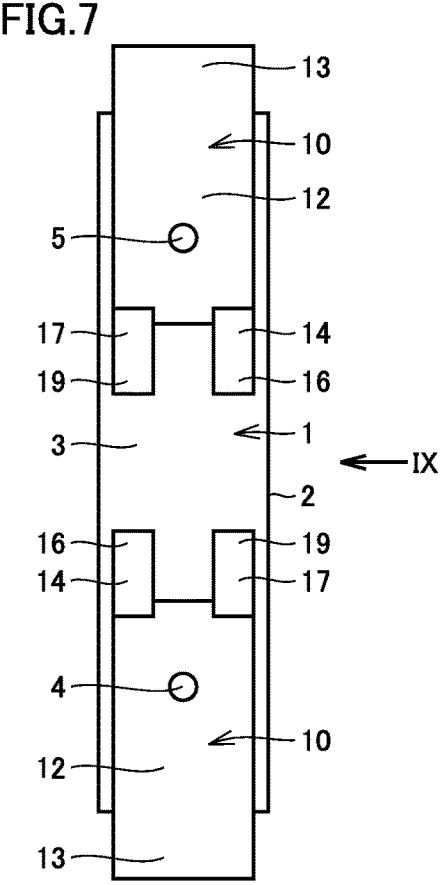
FIG. 7 is a plan view of a state that the fixed bus bar is attached to the battery cell.
Figure 8:
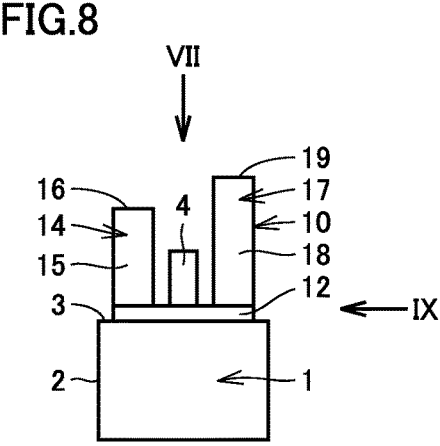
FIG. 8 is a front view of the state that the fixed bus bar is attached to the battery cell.
Figure 9:
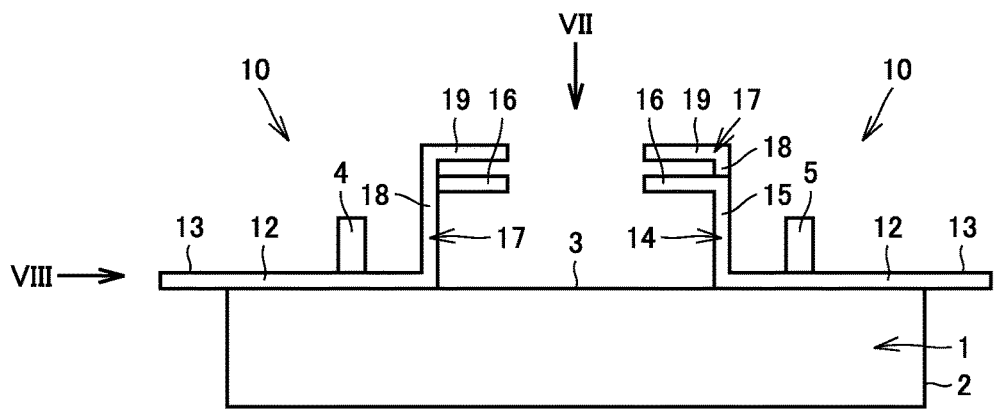
FIG. 9 is a side view of the state that the fixed bus bar is attached to the battery cell.

FIG. 7 is a plan view of a state that fixed bus bar 10 shown in FIGS. 1 to 3 is attached to battery cell 1 shown in FIGS. 4 to 6. FIG. 8 is a front view of the state that fixed bus bar 10 is attached to battery cell 1. FIG. 9 is a side view of the state that fixed bus bar 10 is attached to battery cell 1. FIG. 7 illustrates battery cell 1 and fixed bus bar 10 viewed in a direction shown with an arrow VII shown in FIGS. 8 and 9. FIG. 8 illustrates battery cell 1 and fixed bus bar 10 viewed in a direction shown with an arrow VIII shown in FIGS. 7 and 9. FIG. 9 illustrates battery cell 1 and fixed bus bar 10 viewed in a direction shown with an arrow IX shown in FIGS. 7 and 8.

While fixed bus bar 10 is attached to battery cell 1, terminals 4 and 5 of battery cell 1 are inserted in terminal attachment portions 11 of fixed bus bars 10. Thus, fixed bus bar 10 is electrically connected to any of the positive electrode terminal and the negative electrode terminal and fixed to battery cell 1. Fixed bus bar 10 is attached to lid portion 3 of battery cell 1 so as not to move relative to battery cell 1.

While fixed bus bar 10 is attached to battery cell 1, flat portion 12 of fixed bus bar 10 is arranged along lid portion 3 of battery cell 1. Protruding portions 14 and 17 of fixed bus bar 10 protrude from flat portion 12 in a direction away from battery cell 1. Erected portions 15 and 18 extend in parallel to terminals 4 and 5. Erected portions 15 and 18 are orthogonal to lid portion 3. Second fixed-side contact portions 16 and 19 extend in parallel to lid portion 3.

Fixed bus bar 10 connected to terminal 4 of battery cell 1 and fixed bus bar 10 connected to terminal 5 are each fixed bus bar 10 shown in FIGS. 1 to 3 and they are the same in construction. While two fixed bus bars 10 are attached to battery cell 1, protruding portion 14 of one fixed bus bar 10 and protruding portion 17 of the other fixed bus bar 10 are opposed to each other, and protruding portion 17 of one fixed bus bar 10 and protruding portion 14 of the other fixed bus bar 10 are opposed to each other. While two fixed bus bars 10 are attached to battery cell 1, first fixed-side contact portion 13 of each fixed bus bar 10 is arranged at a position lying off battery cell 1.

Second fixed-side contact portions 16 and 16 of two fixed bus bars 10 are equidistant from lid portion 3 of battery cell 1. Second fixed-side contact portions 16 and 16 of two fixed bus bars 10 are arranged on the same plane in parallel to a direction in which lid portion 3 extends. Second fixed-side contact portions 19 and 19 of two fixed bus bars 10 are equidistant from lid portion 3 of battery cell 1. Second fixed-side contact portions 19 and 19 of two fixed bus bars 10 are arranged on the same plane in parallel to the direction in which lid portion 3 extends.

Figure 10:
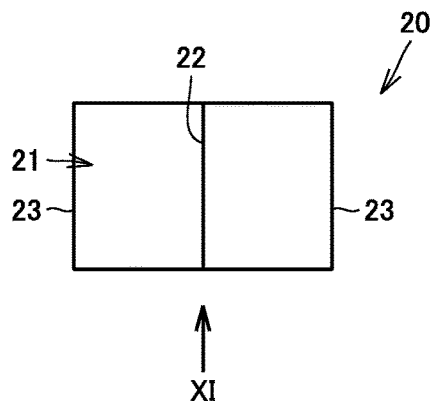
FIG. 10 is a plan view of a first movable bus bar.
Figure 11:
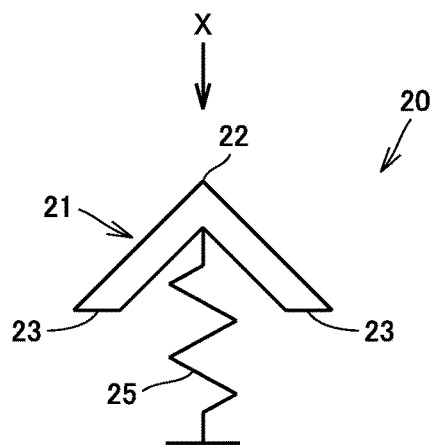
FIG. 11 is a front view of the first movable bus bar.

FIG. 10 is a plan view of a first movable bus bar 20 included in the battery assembly in the present embodiment. FIG. 11 is a front view of first movable bus bar 20. FIG. 10 illustrates first movable bus bar 20 viewed in a direction shown with an arrow X shown in FIG. 11. FIG. 11 illustrates first movable bus bar 20 viewed in a direction shown with an arrow XI shown in FIG. 10.

First movable bus bar 20 has a conductive portion 21 and a first expansion and contraction portion 25. Conductive portion 21 is formed in such a shape that two flat plates are engaged with each other at edge portions thereof. Conductive portion 21 is formed in an L shape in a side view. Conductive portion 21 has a corner portion 22 corresponding to a bent portion of the L shape and two first movable-side contact portions 23 corresponding to opposing end portions of the L shape. First movable-side contact portions 23 and 23 are provided such that they can be in contact with first fixed-side contact portions 13 of fixed bus bars 10, respectively.

First expansion and contraction portion 25 is a spring and extends in a vertical direction in FIG. 11. First expansion and contraction portion 25 is provided to be expandable and contractible in a direction of extension thereof (in the vertical direction in FIG. 11). First expansion and contraction portion 25 has an upper end coupled to conductive portion 21. First expansion and contraction portion 25 has the upper end coupled to the inside of bending of corner portion 22. First expansion and contraction portion 25 has a lower end fixed to lid portions 3 (FIGS. 4 to 6) of battery cells 1. In the front view shown in FIG. 11, conductive portion 21 is arranged in symmetry with respect to the direction in which first expansion and contraction portion 25 extends.

Figure 12:
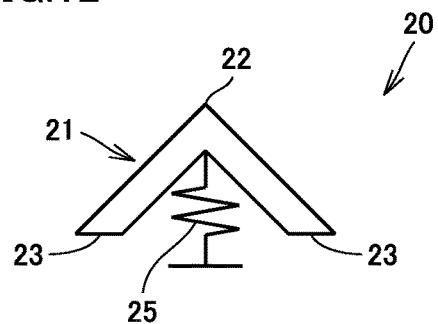
FIG. 12 is a front view of the first movable bus bar in a state that a first expansion and contraction portion contracts.

FIG. 12 is a front view of first movable bus bar 20 in a state that first expansion and contraction portion 25 contracts. By applying a load to first movable bus bar 20 from above in FIG. 12, first expansion and contraction portion 25 contracts in the vertical direction in FIG. 12. Therefore, in FIG. 12, a position of conductive portion 21 relative to the lower end of first expansion and contraction portion 25 has changed as compared with arrangement shown in FIG. 11. Conductive portion 21 shown in FIG. 11 is relatively great in distance from the lower end of first expansion and contraction portion 25, and conductive portion 21 shown in FIG. 12 is relatively small in distance from the lower end of first expansion and contraction portion 25.

Since first expansion and contraction portion 25 has the lower end fixed to lid portions 3 of battery cells 1, conductive portion 21 can move relative to lid portion 3 with expansion and contraction of first expansion and contraction portion 25. Thus, first movable bus bar 20 is movable in directions toward and away from lid portion 3. First movable-side contact portion 23 is provided such that a distance from lid portion 3 is variable. With expansion and contraction of first expansion and contraction portion 25, first movable-side contact portion 23 is movable in the direction toward fixed bus bar 10 attached to lid portion 3 and in the direction away from fixed bus bar 10.

Figure 13:
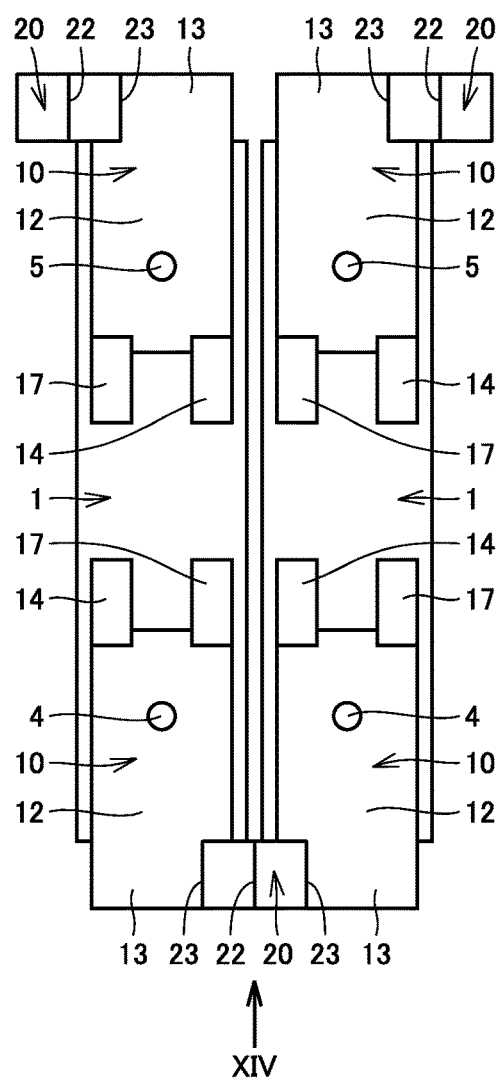
FIG. 13 is a plan view of a state that the first movable bus bar is attached to the battery cells.
Figure 14:
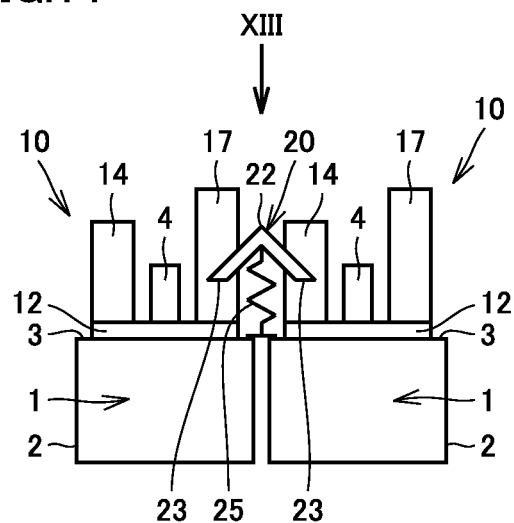
FIG. 14 is a front view of the state that the first movable bus bar is attached to the battery cells.

FIG. 13 is a plan view of a state that first movable bus bar 20 is attached to battery cells 1. FIG. 14 is a front view of the state that first movable bus bar 20 is attached to battery cells 1. FIG. 13 illustrates battery cell 1, fixed bus bar 10, and first movable bus bar 20 viewed in a direction shown with an arrow XIII shown in FIG. 14. FIG. 14 illustrates battery cell 1, fixed bus bar 10, and first movable bus bar 20 viewed in a direction shown with an arrow XIV shown in FIG. 13.

In FIGS. 13 and 14, two battery cells 1 to which two fixed bus bars 10 are attached as shown in FIGS. 7 to 9 are arranged as being juxtaposed. Battery cells 1 each in a shape like a substantially rectangular box are aligned in a direction of a short side of a rectangle which corresponds to a two-dimensional view of battery cell 1. First fixed-side contact portions 13 of fixed bus bars 10 attached to adjacent battery cells 1 are aligned at an interval from each other in the direction of the short side of the rectangle which corresponds to the two-dimensional view of battery cell 1. A direction of alignment of a plurality of battery cells 1 (a lateral direction in FIGS. 13 and 14) is referred to as a direction of disposition of battery cells 1.

Terminals 4 of adjacent battery cells 1 are different from each other in polarity. Terminals 5 of adjacent battery cells 1 are different from each other in polarity. In battery cell 1 on the right in FIGS. 13 and 14, terminal 4 is a positive electrode terminal and terminal 5 is a negative electrode terminal. In battery cell 1 on the left in FIGS. 13 and 14, terminal 4 is a negative electrode terminal and terminal 5 is a positive electrode terminal.

First movable bus bar 20 is arranged in a gap between adjacent first fixed-side contact portions 13. First movable bus bar 20 is arranged around a short side of a rectangle which corresponds to a two-dimensionally rectangular shape of lid portion 3. First expansion and contraction portion 25 of first movable bus bar 20 has the lower end attached to lid portions 3 of battery cells 1, which are exposed between two adjacent first fixed-side contact portions 13. Conductive portion 21 is arranged above first fixed-side contact portions 13, across both of two adjacent first fixed-side contact portions 13. First movable-side contact portion 23 shown on the left in FIGS. 13 and 14 is arranged as being opposed to first fixed-side contact portion 13 of fixed bus bar 10 on the left in the drawings. First movable-side contact portion 23 shown on the right in FIGS. 13 and 14 is arranged as being opposed to first fixed-side contact portion 13 of fixed bus bar 10 on the right in the drawings.

A self weight of conductive portion 21 is applied from above to the first expansion and contraction portion shown in FIGS. 13 and 14, and the first expansion and contraction portion is compressed. With spring force resulting from thus deformed first expansion and contraction portion 25 attempting to restore its length to a natural length, conductive portion 21 is biased in a direction away from first fixed-side contact portions 13. First expansion and contraction portion 25 biases first movable-side contact portions 23 forming a part of conductive portion 21 in a direction away from flat portions 12 forming first fixed-side contact portions 13.

Since first movable-side contact portions 23 are arranged at positions where they are in non-contact with first fixed-side contact portions 13, adjacent first fixed-side contact portions 13 have electrically been disconnected from each other.

Figure 15:
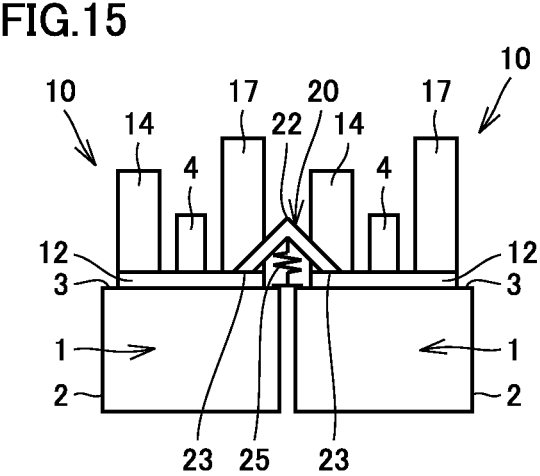
FIG. 15 is a front view of a state that the first movable bus bar is brought in contact with the fixed bus bars.

FIG. 15 is a front view of a state that first movable bus bar 20 is brought in contact with fixed bus bars 10. By applying a downward load from above to first movable bus bar 20 shown in FIG. 14, first expansion and contraction portion 25 is compressed and conductive portion 21 is displaced downward. The direction of disposition of the plurality of battery cells 1 is in the lateral direction in FIG. 15, and first movable bus bar 20 moves in a direction orthogonal to the direction of disposition of battery cells 1. By moving conductive portion 21 until first movable-side contact portions 23 are in contact with first fixed-side contact portions 13, the construction shown in FIG. 15 is obtained.

Here, two adjacent fixed bus bars 10 are electrically connected to each other through conductive portion 21 of first movable bus bar 20. Fixed bus bar 10 on the left in the drawing connected to terminal 4 which is the negative electrode terminal and fixed bus bar 10 on the right in the drawing connected to terminal 4 which is the positive electrode terminal are electrically connected to each other. As the positive electrode and the negative electrode of two adjacent battery cells 1 are connected to each other, two battery cells 1 are connected in series.

Figure 16:
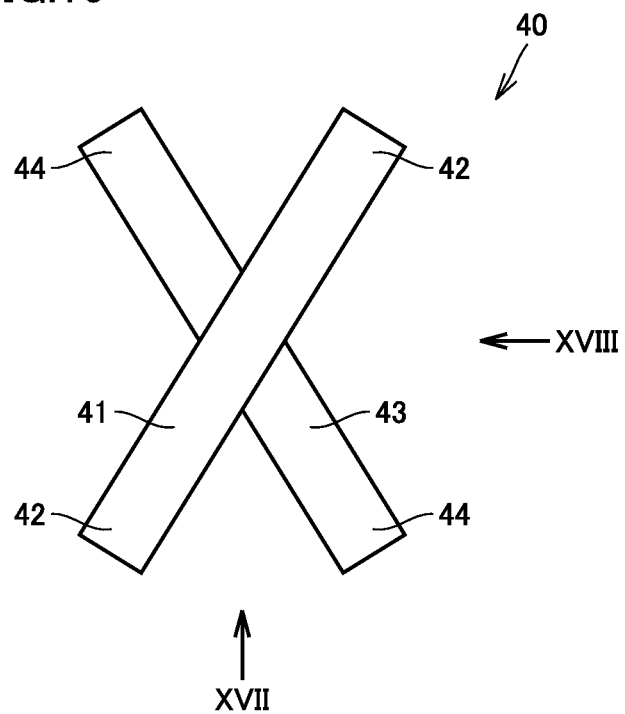
FIG. 16 is a plan view of a second movable bus bar.
Figure 17:
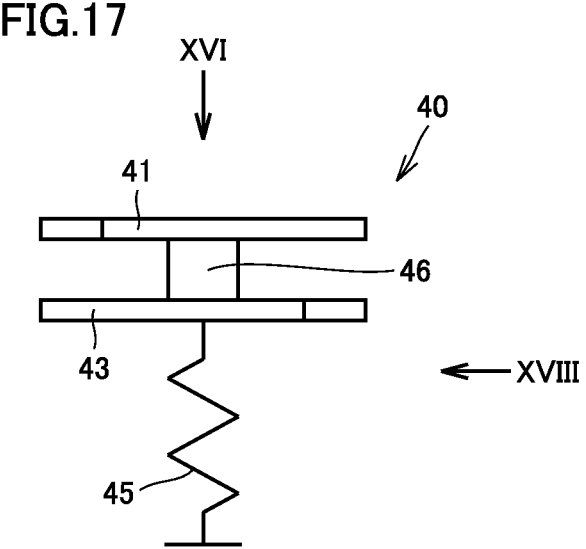
FIG. 17 is a front view of the second movable bus bar.
Figure 18:
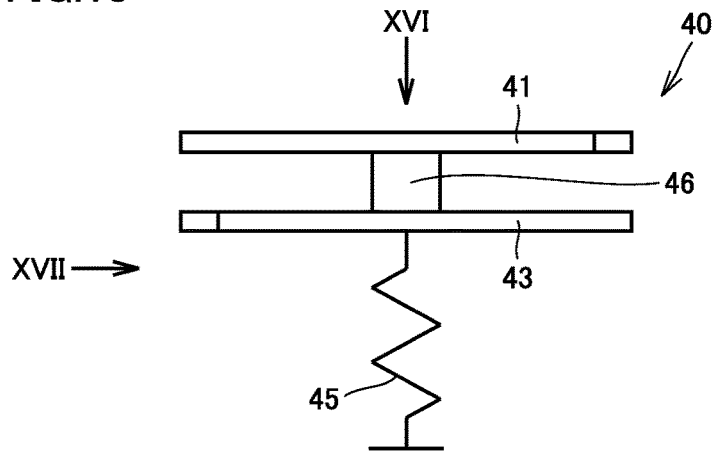
FIG. 18 is a side view of the second movable bus bar.

FIG. 16 is a plan view of a second movable bus bar 40 included in the battery assembly in the present embodiment. FIG. 17 is a front view of second movable bus bar 40 shown in FIG. 16. FIG. 18 is a side view of second movable bus bar 40 shown in FIGS. 16 and 17. FIG. 16 illustrates second movable bus bar 40 viewed in a direction shown with an arrow XVI shown in FIGS. 17 and 18. FIG. 17 illustrates second movable bus bar 40 viewed in a direction shown with an arrow XVII shown in FIGS. 16 and 18. FIG. 18 illustrates second movable bus bar 40 viewed in a direction shown with an arrow XVIII shown in FIGS. 16 and 17.

Second movable bus bar 40 has two conductive portions 41 and 43, a second expansion and contraction portion 45, and an insulating portion 46. Conductive portions 41 and 43 are each formed in a shape of a flat rod. Conductive portion 41 has two second movable-side contact portions 42 and 42 at respective opposing ends. Second movable-side contact portions 42 and 42 are provided such that they can be in contact with second fixed-side contact portions 19 of fixed bus bars 10. Conductive portion 43 has two second movable-side contact portions 44 and 44 at respective opposing ends. Second movable-side contact portions 44 and 44 are provided such that they can be in contact with second fixed-side contact portions 16 of fixed bus bars 10.

Conductive portion 41 and conductive portion 43 are arranged in parallel to each other. Conductive portion 41 and conductive portion 43 are arranged as intersecting in the plan view shown in FIG. 16. Conductive portion 41 and conductive portion 43 intersect with each other such that central positions in longitudinal directions thereof coincide with each other in the plan view. Second movable-side contact portion 42 provided at an end portion of conductive portion 41 and second movable-side contact portion 44 provided at an end portion of conductive portion 43 are arranged at positions where they do not coincide with each other in the plan view.

Second expansion and contraction portion 45 is a spring. In the front view shown in FIG. 17 and the side view shown in FIG. 18, second expansion and contraction portion 45 extends in the vertical direction in the drawings. Second expansion and contraction portion 45 is provided to be expandable and contractible in a direction of extension thereof. Second expansion and contraction portion 45 has a lower end fixed to lid portions 3 (FIGS. 4 to 6) of battery cells 1. Second expansion and contraction portion 45 has an upper end coupled to a lower surface of conductive portion 43. Second expansion and contraction portion 45 is coupled to a center of gravity of a rectangle corresponding to a two-dimensional shape of conductive portion 43. Second expansion and contraction portion 45 is arranged at a position where conductive portion 41 and conductive portion 43 intersect with each other in the plan view.

Conductive portion 41 and conductive portion 43 are stacked in a direction of thickness of the flat rod, with insulating portion 46 being interposed therebetween. Insulating portion 46 is provided to create a height difference between conductive portion 41 and conductive portion 43 so as to prevent electrical conduction between conductive portion 41 and conductive portion 43. Insulating portion 46 is arranged at the position where conductive portion 41 and conductive portion 43 intersect with each other in the plan view. At the position where conductive portion 41 and conductive portion 43 intersect with each other in the plan view, second expansion and contraction portion 45, conductive portion 43, insulating portion 46, and conductive portion 41 are arranged in this order.

Figure 19:
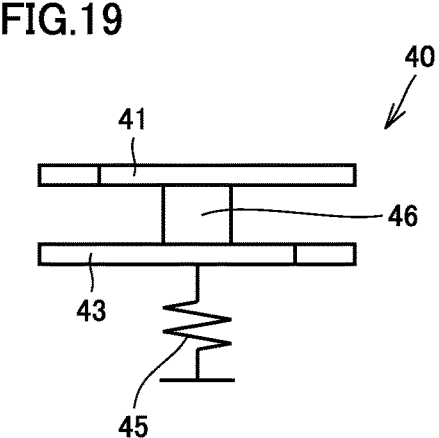
FIG. 19 is a front view of the second movable bus bar in a state that a second expansion and contraction portion contracts.
Figure 20:
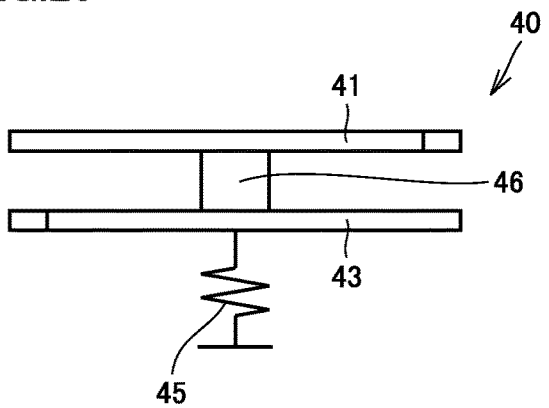
FIG. 20 is a side view of the second movable bus bar in the state that the second expansion and contraction portion contracts.

FIG. 19 is a front view of second movable bus bar 40 in a state that second expansion and contraction portion 45 contracts. FIG. 20 is a side view of second movable bus bar 40 in the state that second expansion and contraction portion 45 contracts. By applying a load to second movable bus bar 40 from above in FIGS. 19 and 20, second expansion and contraction portion 45 contracts in the vertical direction in FIGS. 19 and 20. Therefore, in FIGS. 19 and 20, positions of conductive portions 41 and 43 relative to the lower end of second expansion and contraction portion 45 has changed as compared with arrangement shown in FIGS. 17 and 18. Conductive portions 41 and 43 shown in FIGS. 17 and 18 are relatively great in distance from the lower end of second expansion and contraction portion 45, and conductive portions 41 and 43 in FIGS. 19 and 20 are relatively small in distance from the lower end of second expansion and contraction portion 45.

Since second expansion and contraction portion 45 has the lower end fixed to lid portions 3 of battery cells 1, conductive portions 41 and 43 can move relative to lid portion 3 with expansion and contraction of second expansion and contraction portion 45. Thus, second movable bus bar 40 is relatively movable in directions toward and away from lid portion 3. Second movable-side contact portions 42 and 44 are provided such that a distance from lid portion 3 is variable. With expansion and contraction of second expansion and contraction portion 45, second movable-side contact portions 42 and 44 are movable in the direction away from fixed bus bar 10 attached to lid portion 3 and the direction toward fixed bus bar 10.

Figure 21:
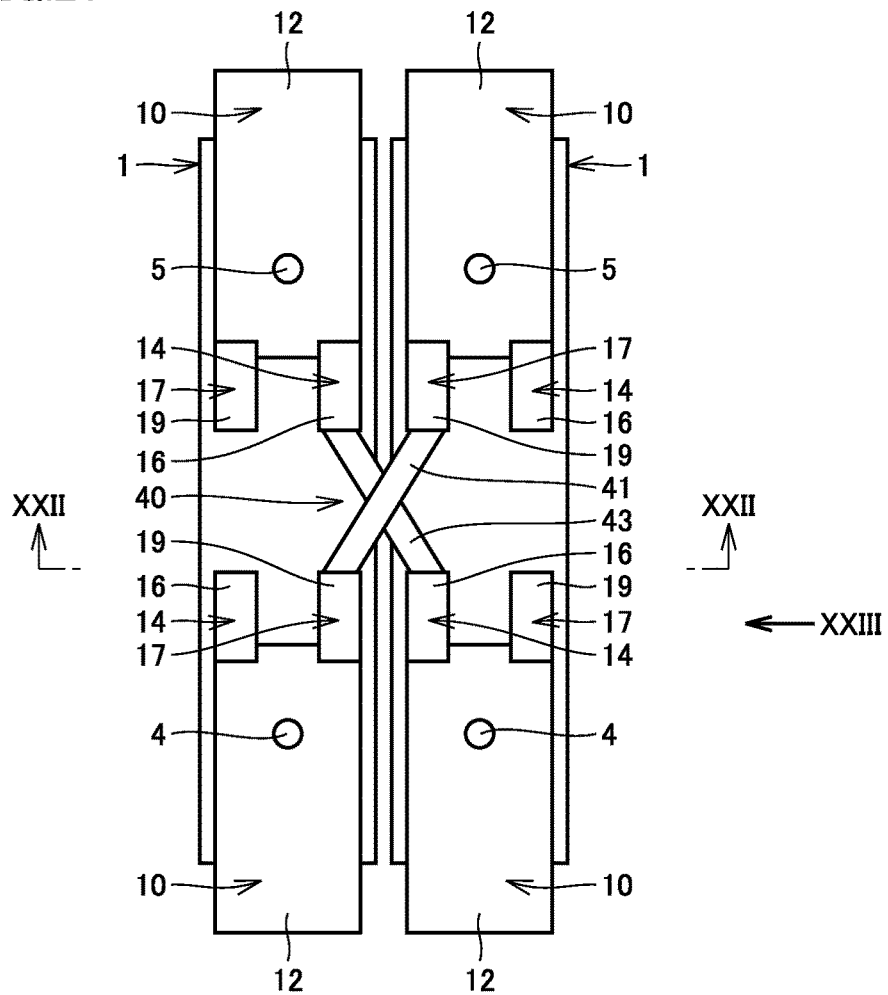
FIG. 21 is a plan view of a state that the second movable bus bar is attached to the battery cells.
Figure 22:
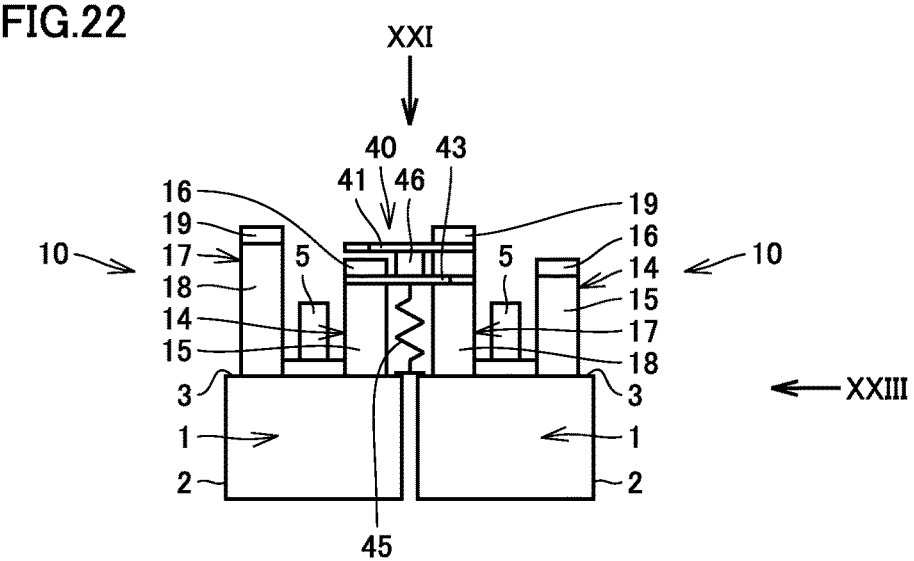
FIG. 22 is a partial cross-sectional view of the state that the second movable bus bar is attached to the battery cells.
Figure 23:
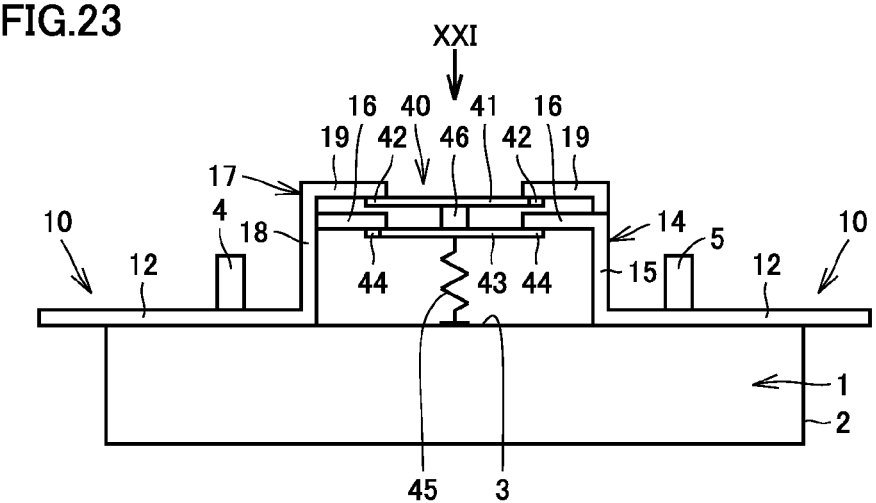
FIG. 23 is a side view of the state that the second movable bus bar is attached to the battery cells.

FIG. 21 is a plan view of a state that second movable bus bar 40 is attached to battery cells 1. FIG. 22 is a partial cross-sectional view of the state that second movable bus bar 40 is attached to battery cells 1. FIG. 23 is a side view of the state that second movable bus bar 40 is attached to battery cells 1. FIG. 21 illustrates battery cell 1, fixed bus bar 10, and second movable bus bar 40 viewed in a direction shown with an arrow XXI shown in FIGS. 22 and 23. FIG. 22 schematically illustrates battery cell 1, fixed bus bar 10, and second movable bus bar 40 along the line XXII-XXII shown in FIG. 21. FIG. 23 illustrates battery cell 1, fixed bus bar 10, and second movable bus bar 40 viewed in a direction shown with an arrow XXIII shown in FIGS. 21 and 22.

In FIGS. 21 and 22, as in FIGS. 13 and 14 described above, two battery cells 1 to which two fixed bus bars 10 are attached are arranged as being juxtaposed. Second movable bus bar 40 is arranged across two adjacent battery cells 1. Second movable bus bar 40 is arranged in the vicinity of a central portion of a long side of a rectangle which corresponds to a two-dimensionally rectangular view of lid portion 3.

Conductive portion 41 is connected to second fixed-side contact portions 19 and 19 of two fixed bus bars 10. Referring to FIG. 21, one second movable-side contact portion 42 of conductive portion 41 is arranged below second fixed-side contact portion 19 of fixed bus bar 10 on the upper right side in the drawing. The other second movable-side contact portion 42 of conductive portion 41 is arranged below second fixed-side contact portion 19 of fixed bus bar 10 on the lower left side in the drawing. Second movable-side contact portion 42 is arranged as being opposed to a lower surface of second fixed-side contact portion 19 and is in contact with the lower surface of second fixed-side contact portion 19.

Conductive portion 43 is connected to second fixed-side contact portions 16 and 16 of two fixed bus bars 10. Referring to FIG. 21, one second movable-side contact portion 44 of conductive portion 43 is arranged below second fixed-side contact portion 16 of fixed bus bar 10 on the upper left side in the drawing. The other second movable-side contact portion 44 of conductive portion 43 is arranged below second fixed-side contact portion 16 of fixed bus bar 10 on the lower right side in the drawing. Second movable-side contact portion 44 is arranged as being opposed to a lower surface of second fixed-side contact portion 16 and is in contact with the lower surface of second fixed-side contact portion 16.

Fixed bus bar 10 on the lower right side in FIG. 21 is connected to terminal 4 which is the positive electrode terminal. Fixed bus bar 10 on the lower left side in FIG. 21 is connected to terminal 4 which is the negative electrode terminal. Fixed bus bar 10 on the upper right side in FIG. 21 is connected to terminal 5 which is the negative electrode terminal. Fixed bus bar 10 on the upper left side in FIG. 21 is connected to terminal 5 which is the positive electrode terminal.

Fixed bus bar 10 on the upper right side in FIG. 21 and fixed bus bar 10 on the lower left side are electrically connected to each other through conductive portion 41 of second movable bus bar 40. Fixed bus bar 10 on the upper left side in FIG. 21 and fixed bus bar 10 on the lower right side are electrically connected to each other through conductive portion 43 of second movable bus bar 40.

Fixed bus bar 10 on the lower right side in FIG. 21 connected to terminal 4 which is the positive electrode terminal and fixed bus bar 10 on the upper left side in FIG. 21 connected to terminal 5 which is the positive electrode terminal are electrically connected to each other. Fixed bus bar 10 on the lower left side in FIG. 21 connected to terminal 4 which is the negative electrode terminal and fixed bus bar 10 on the upper right side in FIG. 21 connected to terminal 5 which is the negative electrode terminal are electrically connected to each other. As positive electrodes of two adjacent battery cells 1 are connected to each other and negative electrodes thereof are connected to each other, two battery cells 1 are connected in parallel.

A distance between second fixed-side contact portions 16 and 19 and a distance between second movable-side contact portions 42 and 44 in a direction of height (the vertical direction in FIGS. 22 and 23) of battery cell 1 are equal to each other. Thus, second movable-side contact portions 42 and 42 of one second movable bus bar 40 can be in contact with second fixed-side contact portions 19 and 19 of fixed bus bars 10 and second movable-side contact portions 44 and 44 can be in contact with second fixed-side contact portions 16 and 16 of fixed bus bars 10.

An amount of deformation of second expansion and contraction portion 45 in a state shown in FIGS. 21 to 23 is greater than an amount of deformation, that is, compression, resulting from application of a self weight of conductive portions 41 and 43 and insulating portion 46. In addition to the self weight of conductive portions 41 and 43 and insulating portion 46, stress received from second fixed-side contact portions 16 and 19 is applied to second expansion and contraction portion 45. With spring force of thus deformed second expansion and contraction portion 45 attempting to restore its length to a natural length, second movable-side contact portions 42 and 44 are biased toward second fixed-side contact portions 19 and 16. Second expansion and contraction portion 45 biases second movable-side contact portions 42 and 44 in a direction bringing second movable-side contact portions 42 and 44 closer to second fixed-side contact portions 19 and 16 forming a part of protruding portions 14 and 17 of fixed bus bar 10.

Figure 24:
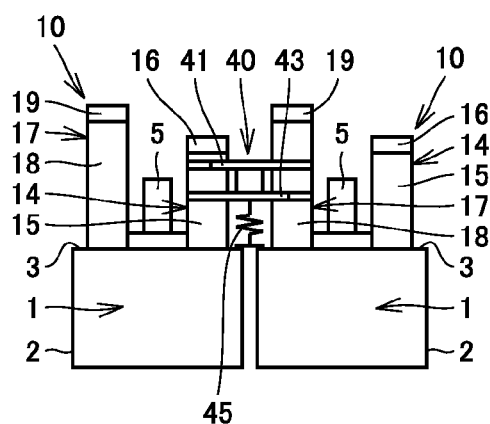
FIG. 24 is a partial cross-sectional view of a state that the second movable bus bar and the fixed bus bar are in non-contact with each other.
Figure 25:
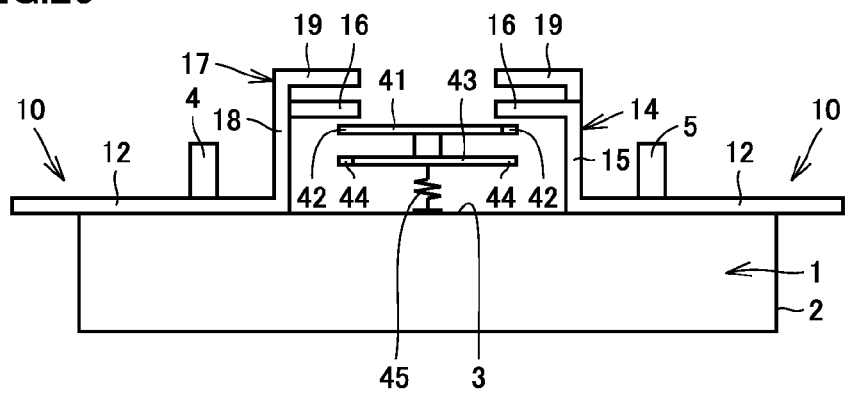
FIG. 25 is a side view of the state that the second movable bus bar and the fixed bus bar are in non-contact with each other.

FIG. 24 is a partial cross-sectional view of a state that second movable bus bar 40 and fixed bus bar 10 are in non-contact with each other. FIG. 25 is a side view of the state that second movable bus bar 40 and fixed bus bar 10 are in non-contact with each other. By applying a downward load to second movable bus bar 40 shown in FIGS. 22 and 23 from above, second expansion and contraction portion 45 is compressed and conductive portions 41 and 43 are displaced downward. Second movable bus bar 40 moves in a direction orthogonal to the direction of disposition of battery cells 1. By moving conductive portion 41 until second movable-side contact portion 42 is away from second fixed-side contact portion 19 and moving conductive portion 43 until second movable-side contact portion 44 is away from second fixed-side contact portion 16, the construction shown in FIGS. 24 and 25 is obtained.

Second movable-side contact portion 42 is arranged at a position where it is in non-contact with second fixed-side contact portion 19, and second movable-side contact portion 44 is arranged at a position where it is in non-contact with second fixed-side contact portion 16. Therefore, electrical connection between adjacent second fixed-side contact portions 16 through conductive portion 43 has been released, and electrical connection between adjacent second fixed-side contact portions 19 through conductive portion 41 has been released.

Figure 26:
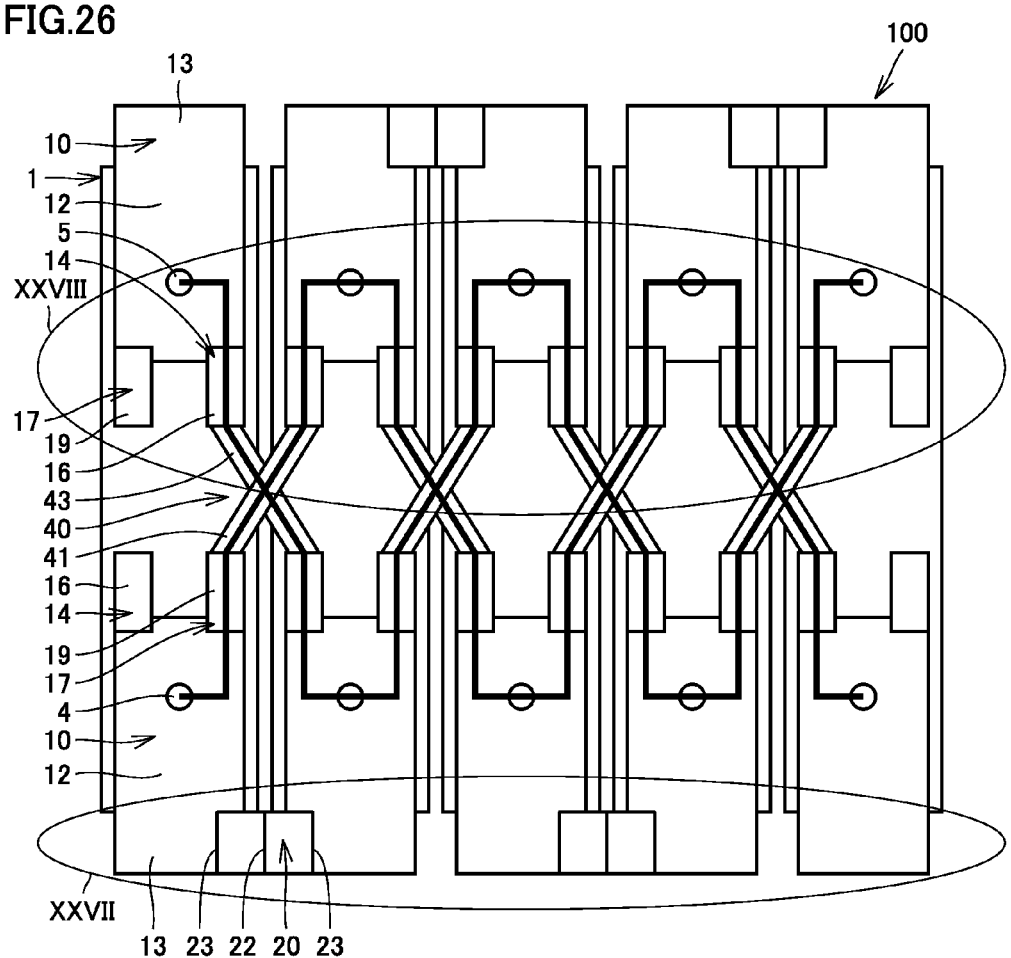
FIG. 26 is a plan view showing a battery assembly in which connection in parallel is established.
Figure 27:
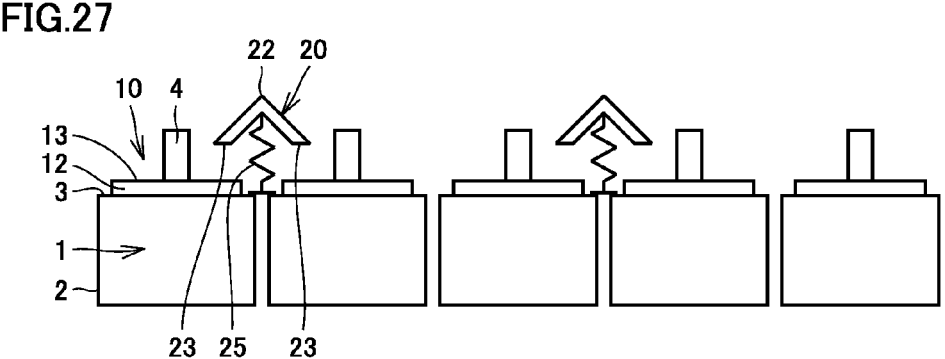
FIG. 27 is a schematic diagram showing a state of connection of battery cells in a region XXVII in FIG. 26.
Figure 28:
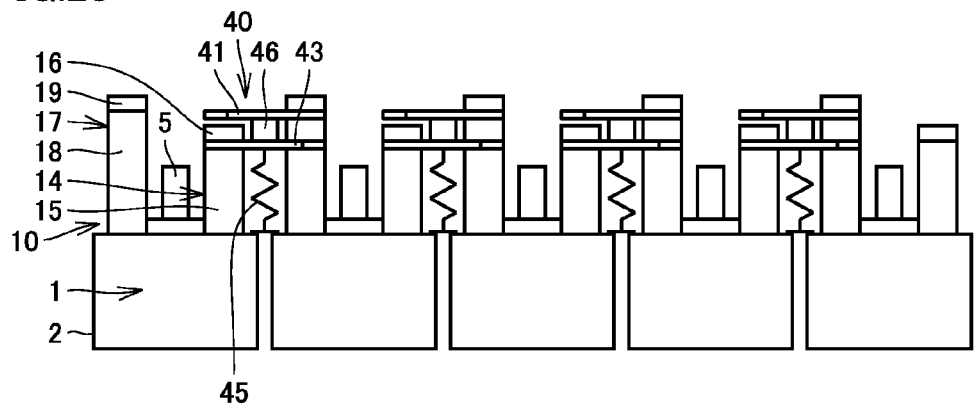
FIG. 28 is a schematic diagram showing a state of connection of battery cells in a region XXVIII in FIG. 26.

FIG. 26 is a plan view showing battery assembly 100 in which connection in parallel is established. FIG. 27 is a schematic diagram showing a state of connection of battery cells 1 in a region XXVII in FIG. 26. FIG. 28 is a schematic diagram showing the state of connection of battery cells 1 in a region XXVIII in FIG. 26. FIGS. 26 to 28 and FIGS. 29 to 31 which will be described later illustrate battery assembly 100 formed as a plurality of battery cells 1 are stacked. Fixed bus bar 10, first movable bus bar 20, and second movable bus bar 40 are structural parts for electrically connecting battery cells 1 constituting battery assembly 100 with one another.

Referring to FIG. 27 and FIG. 14 described above, conductive portion 21 of first movable bus bar 20 is arranged at a position distant from flat portions 12 of fixed bus bars 10, and first movable-side contact portions 23 are in non-contact with first fixed-side contact portions 13. Therefore, adjacent first fixed-side contact portions 13 have electrically been disconnected from each other.

Referring to FIG. 28 and FIGS. 22 and 23 described above, conductive portion 41 of second movable bus bar 40 is arranged at a position where it is in contact with protruding portions 17 of fixed bus bars 10, and second movable-side contact portions 42 are in contact with second fixed-side contact portions 19. Conductive portion 43 of second movable bus bar 40 is arranged at a position where it is in contact with protruding portions 14 of fixed bus bars 10, and second movable-side contact portions 44 are in contact with second fixed-side contact portions 16. Therefore, terminals having the same polarity are electrically connected to each other so that two adjacent battery cells 1 are connected in parallel.

By arranging first movable bus bar 20 as shown in FIG. 27 and arranging second movable bus bar 40 as shown in FIG. 28, a conduction path shown with a bold line in FIG. 26 is formed. Consequently, a plurality of battery cells 1 are connected in parallel, and battery assembly 100 as a whole is based on connection in parallel.

Figure 29:
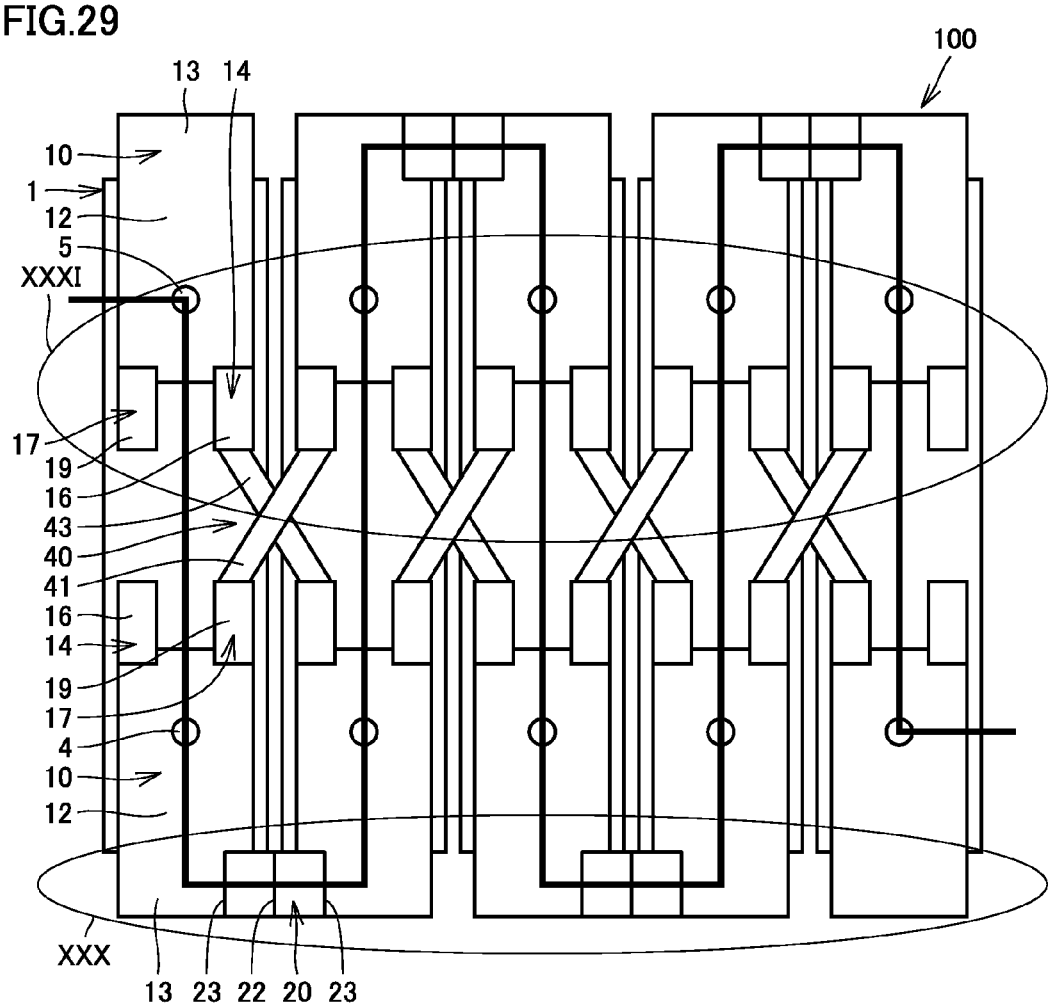
FIG. 29 is a plan view showing a battery assembly in which connection in series is established.
Figure 30:
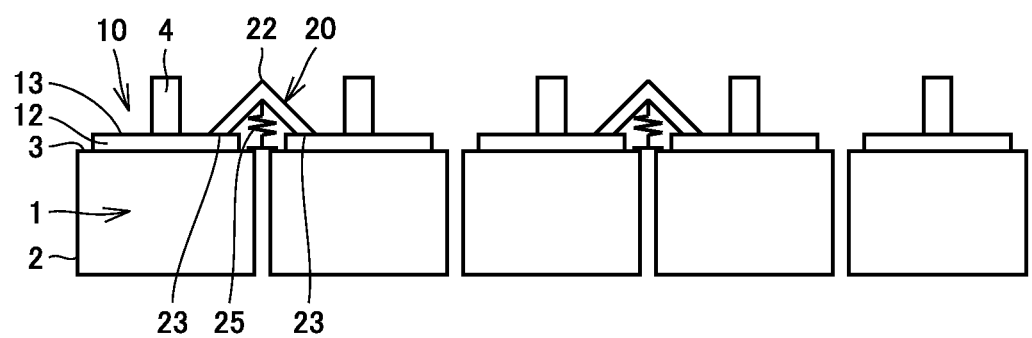
FIG. 30 is a schematic diagram showing a state of connection of battery cells in a region XXX in FIG. 29.
Figure 31:
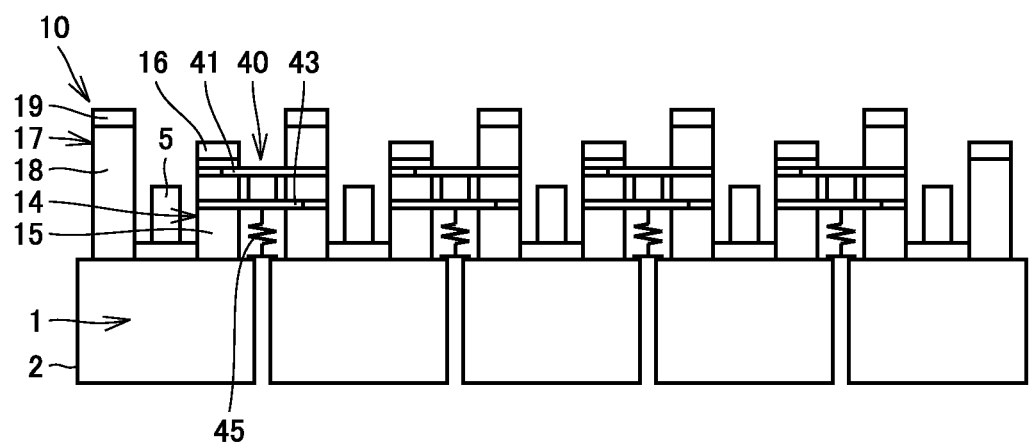
FIG. 31 is a schematic diagram showing the state of connection of battery cells in a region XXXI in FIG. 29.

FIG. 29 is a plan view showing battery assembly 100 in which connection in series is established. FIG. 30 is a schematic diagram showing a state of connection of battery cells 1 in a region XXX in FIG. 29. FIG. 31 is a schematic diagram showing the state of connection of battery cells 1 in a region XXXI in FIG. 29.

Referring to FIG. 30 and FIG. 15 described above, conductive portion 21 of first movable bus bar 20 is arranged at a position where it is in contact with flat portions 12 of fixed bus bars 10 and first movable-side contact portions 23 are in contact with first fixed-side contact portions 13. Therefore, adjacent first fixed-side contact portions 13 are electrically connected to each other and the positive electrode and the negative electrode of two adjacent battery cells 1 are connected to each other. Two adjacent battery cells 1 are thus connected in series.

Referring to FIG. 31 and FIGS. 24 and 25 described above, conductive portion 41 of second movable bus bar 40 is arranged at a position distant from protruding portions 17 of fixed bus bars 10 and second movable-side contact portions 42 are in non-contact with second fixed-side contact portions 19. Conductive portion 43 of second movable bus bar 40 is arranged at a position distant from protruding portions 14 of fixed bus bars 10 and second movable-side contact portions 44 are in non-contact with second fixed-side contact portions 16. Therefore, adjacent second fixed-side contact portions 16 are electrically disconnected from each other and adjacent second fixed-side contact portions 19 are electrically disconnected from each other.

By arranging first movable bus bar 20 as shown in FIG. 30 and arranging second movable bus bar 40 as shown in FIG. 31, a conduction path shown with a bold line in FIG. 29 is formed. Consequently, a plurality of battery cells 1 are connected in series and battery assembly 100 as a whole is based on connection in series. In battery assembly 100 in the present embodiment, by simultaneously contracting first expansion and contraction portion 25 of first movable bus bar 20 and second expansion and contraction portion 45 of second movable bus bar 40, a plurality of battery cells 1 are connected as being switched from connection in parallel to connection in series.

Figure 32:
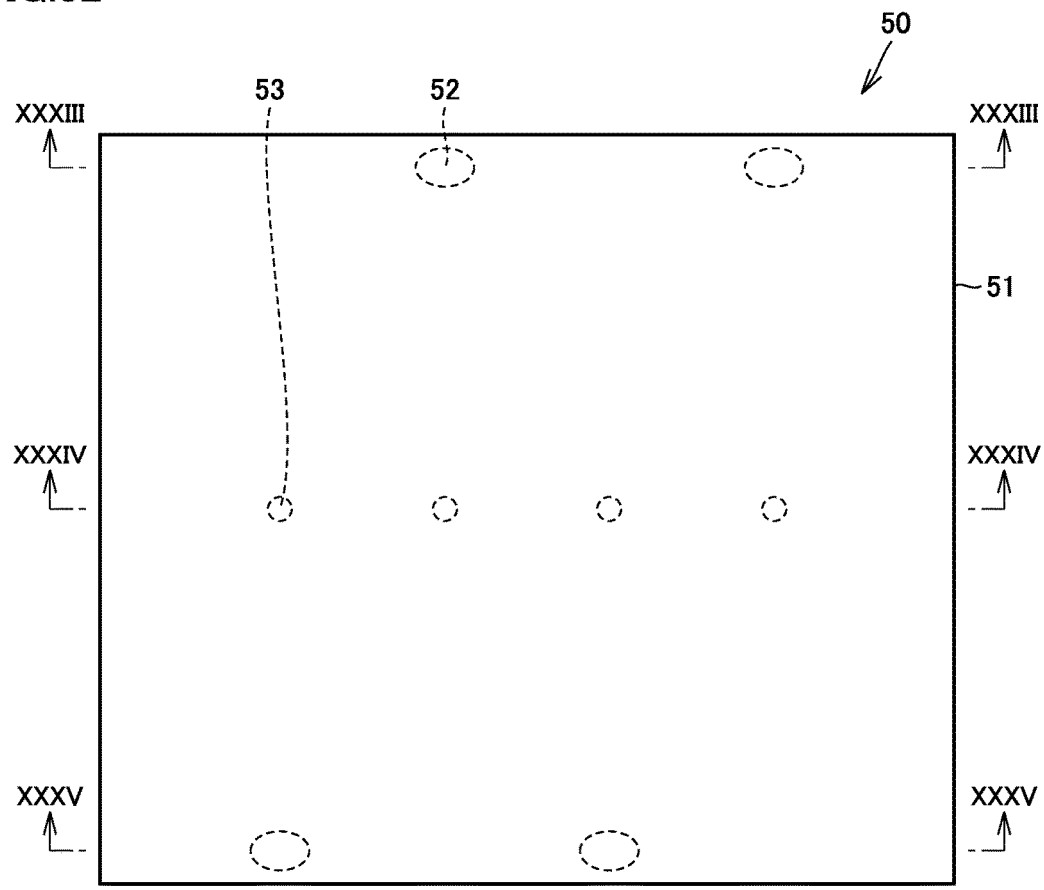
FIG. 32 is a plan view showing a construction of a pressing member.
Figure 33:
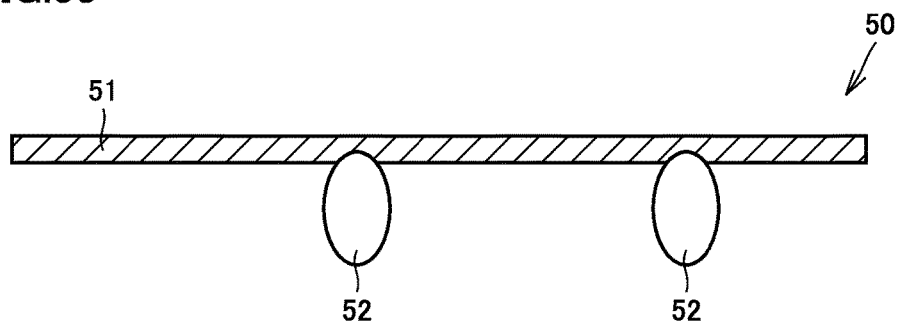
FIG. 33 is a cross-sectional view of the pressing member along the line XXXIII-XXXIII in FIG. 32.
Figure 34:
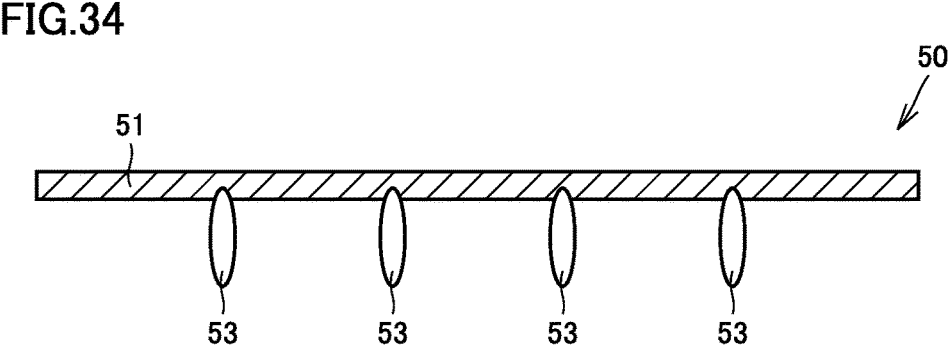
FIG. 34 is a cross-sectional view of the pressing member along the line XXXIV-XXXIV in FIG. 32.
Figure 35:
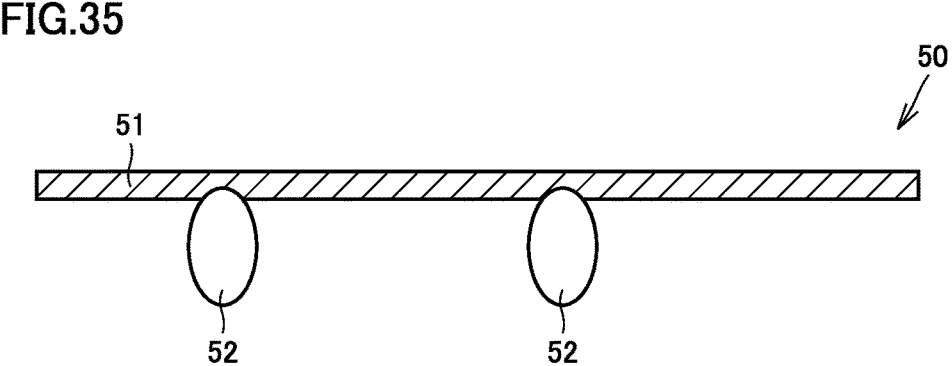
FIG. 35 is a cross-sectional view of the pressing member along the line XXXV-XXXV in FIG. 32.

FIG. 32 is a plan view showing a construction of a pressing member 50. FIG. 33 is a cross-sectional view of pressing member 50 along the line XXXIII-XXXIII in FIG. 32. FIG. 34 is a cross-sectional view of pressing member 50 along the line XXXIV-XXXIV in FIG. 32. FIG. 35 is a cross-sectional view of pressing member 50 along the line XXXV-XXXV in FIG. 32. Pressing member 50 is a member which presses first movable bus bar 20 and second movable bus bar 40 of battery assembly 100 from above, simultaneously presses and compresses first expansion and contraction portions 25 and second expansion and contraction portions 45, and moves both of first movable bus bars 20 and second movable bus bars 40 toward lid portions 3 of battery cells 1, as being used together with battery assembly 100.

Pressing member 50 has a support portion 51 in a form of a flat plate. A plurality of downwardly protruding portions 52 and 53 are attached to a lower surface of support portion 51. Downwardly protruding portions 52 and 53 protrude from the lower surface of support portion 51. Downwardly protruding portions 52 and 53 are formed of an electrically insulating material.

Support portion 51 is provided to cover from above, the entire battery assembly 100 in the plan view shown in FIGS. 26 and 29. A position where downwardly protruding portion 52 is arranged corresponds to a position of first movable bus bar 20 shown in FIGS. 26 and 29. A plurality of downwardly protruding portions 52 are provided such that each of them can be in contact with first movable bus bar 20. A position where downwardly protruding portion 53 is arranged corresponds to a position of second movable bus bar 40 shown in FIGS. 26 and 29. A plurality of downwardly protruding portions 53 are provided such that each of them can be in contact with second movable bus bar 40.

Figure 36:
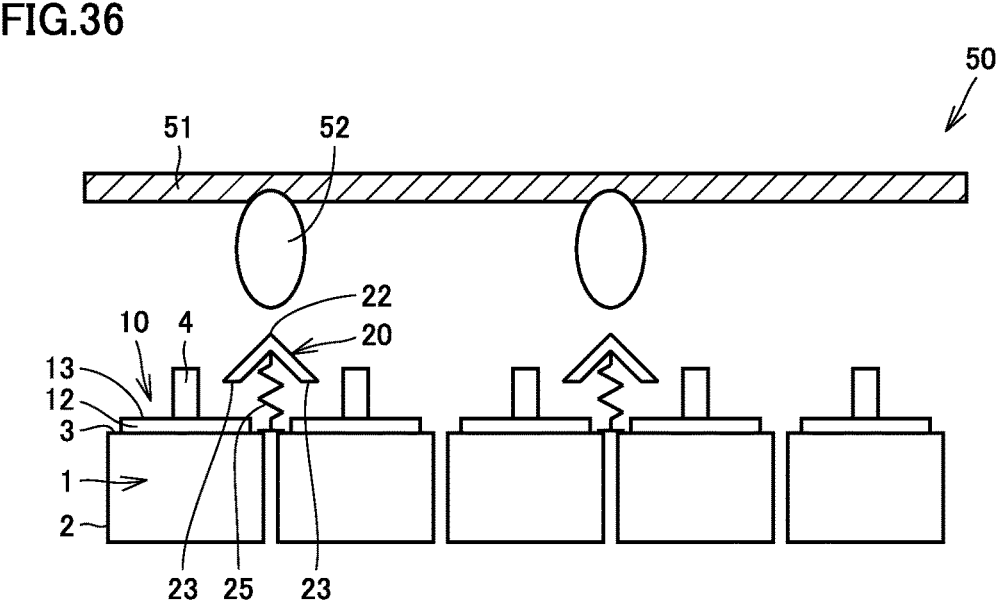
FIG. 36 is a schematic diagram of the pressing member arranged above the first movable bus bar.
Figure 37:
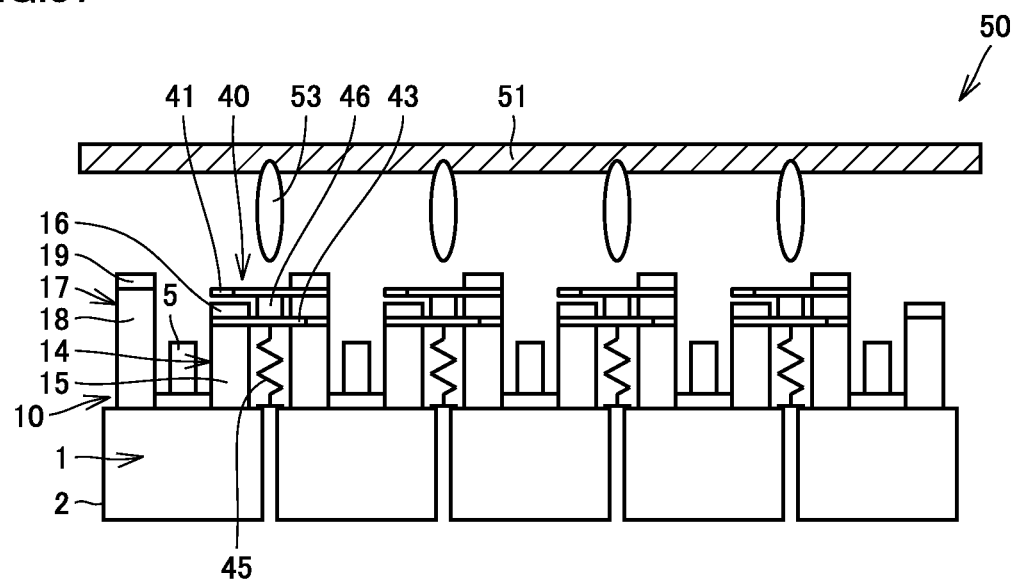
FIG. 37 is a schematic diagram of the pressing member arranged above the second movable bus bar.

FIG. 36 is a schematic diagram of pressing member 50 arranged above first movable bus bar 20. FIG. 37 is a schematic diagram of pressing member 50 arranged above second movable bus bar 40. As described above, downwardly protruding portions 52 are attached to support portion 51 in correspondence with arrangement of first movable bus bars 20. Downwardly protruding portions 53 are attached to support portion 51 in correspondence with arrangement of second movable bus bars 40. By arranging pressing member 50 at an appropriate position, a state shown in FIGS. 36 and 37 that downwardly protruding portions 52 are arranged above first movable bus bars 20 and downwardly protruding portions 53 are arranged above second movable bus bars 40 is obtained.

Here, in first movable bus bar 20, first expansion and contraction portion 25 biases conductive portion 21 in a direction away from fixed bus bars 10. Therefore, first movable-side contact portions 23 of first movable bus bar 20 are not in contact with first fixed-side contact portions 13 of fixed bus bars 10. In second movable bus bar 40, second expansion and contraction portion 45 biases conductive portions 41 and 43 toward fixed bus bars 10. Therefore, second movable-side contact portions 42 of second movable bus bar 40 are in contact with second fixed-side contact portions 19 of fixed bus bars 10 and second movable-side contact portions 44 are in contact with second fixed-side contact portions 16. Battery assembly 100 as a whole is in a state of connection in parallel shown in FIGS. 26 to 28.

Figure 38:
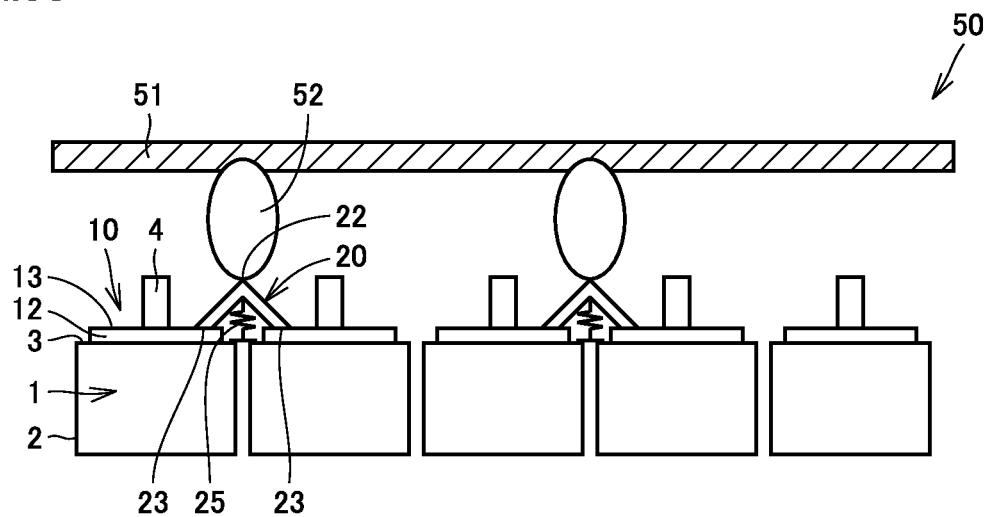
FIG. 38 is a schematic diagram of a state that the pressing member presses the first movable bus bar downward.
Figure 39:
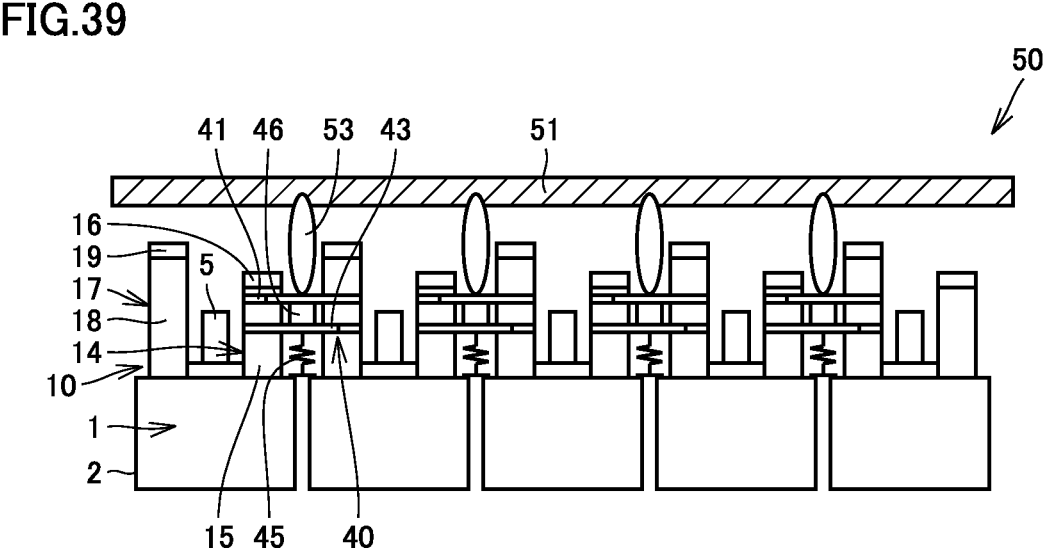
FIG. 39 is a schematic diagram of a state that the pressing member presses the second movable bus bar downward.

FIG. 38 is a schematic diagram of a state that pressing member 50 presses first movable bus bar 20 downward. FIG. 39 is a schematic diagram of a state that pressing member 50 presses second movable bus bar 40 downward.

By moving pressing member 50 shown in FIGS. 36 and 37 in a direction toward battery assembly 100, downwardly protruding portion 52 is in contact with first movable bus bar 20 and downwardly protruding portion 53 is in contact with second movable bus bar 40. By further moving pressing member 50, downwardly protruding portion 52 presses first movable bus bar 20 downward and downwardly protruding portion 53 presses second movable bus bar 40 downward. Thus, first expansion and contraction portion 25 contracts and conductive portion 21 moves in a direction toward fixed bus bars 10, and second expansion and contraction portion 45 contracts and conductive portions 41 and 43 move in a direction away from fixed bus bars 10.

Then, a state shown in FIGS. 38 and 39 that first movable-side contact portions 23 of first movable bus bar 20 are in contact with first fixed-side contact portions 13 of fixed bus bars 10 and second movable-side contact portions 42 and 44 of second movable bus bar 40 are in non-contact with second fixed-side contact portions 19 and 16 of fixed bus bars 10 is obtained. Here, battery assembly 100 as a whole is in a state of connection in series shown in FIGS. 29 to 31.

Battery assembly 100 in the present embodiment may be used as being attached to such a load apparatus as a vehicle. In this case, a construction may be such that, by providing pressing member 50 on the load apparatus side, pressing member 50 presses first movable bus bar 20 and second movable bus bar 40 when battery assembly 100 is mounted on the load apparatus. For example, pressing member 50 may be used as a cover covering battery assembly 100 from above when battery assembly 100 is attached to the load apparatus. Thus, at a time point of attachment of battery assembly 100 to the load apparatus, first movable bus bar 20 and second movable bus bar 40 move and battery assembly 100 is switched to a state of connection in series. Battery assembly 100 in which connection in series is established discharges, charges, and stores necessary electric power for the load apparatus.

In this case, by detaching battery assembly 100 from the load apparatus, pressing of first movable bus bar 20 and second movable bus bar 40 by pressing member 50 is released. Thus, owing to resilience of first expansion and contraction portion 25 and second expansion and contraction portion 45, first movable bus bar 20 and second movable bus bar 40 move and battery assembly 100 is switched to a state of connection in parallel. Battery assembly 100 in which connection in parallel is established equalizes charging rates of battery cells 1 constituting battery assembly 100 and equalizes states of deterioration of the plurality of battery cells 1. Thus, in storage of battery assembly 100 as being detached from the load apparatus, voltage variation among battery cells 1 can be suppressed and uniformity of states of deterioration of all battery cells 1 can be improved.

When connection in parallel is established in battery assembly 100 after battery assembly 100 is formed by stacking battery cells 1 and when micro short-circuiting occurs in battery cell 1 within battery assembly 100, a voltage will be consumed in battery assembly 100 as a whole and voltage fluctuation will be significant. Thus, it becomes easier to find defective battery cell 1 in an early stage.

In order to avoid unexpected breakage of connection in series and connection in parallel of a plurality of battery cells 1 in a case that battery assembly 100 is attached to an apparatus such as a vehicle in which vibration is generated, a construction in which movement of first movable bus bar 20 and second movable bus bar 40 due to vibration can be prevented is desirable. For example, a construction may be such that first movable bus bar 20 and second movable bus bar 40 do not move in spite of vibration 10 times as great as acceleration of gravity.

In order to maintain connection in parallel while battery assembly 100 is vibrating, contact between second movable bus bar 40 and fixed bus bar 10 is desirably prevented from being broken. For example, a load generated as a result of deformation of second expansion and contraction portion 45, with which second movable bus bar 40 is biased toward fixed bus bar 10, is desirably greater than gravity generated from vibration 10 times as great as acceleration of gravity.

More specifically, a relational expression of $kL > 9.8 \times 10 \cdot m = 98m$ is desirably satisfied, where k represents a spring constant of second expansion and contraction portion 45, L represents a distance from second movable-side contact portions 42 and 44 to second fixed-side contact portions 19 and 16, and m represents a mass of second movable bus bar 40.

In order to maintain connection in series while battery assembly 100 is vibrating, a load with which pressing member 50 presses first movable bus bar 20 and second movable bus bar 40 is desirably greater than gravity generated from vibration 10 times as great as acceleration of gravity. The total number of first movable bus bars 20 and second movable bus bars 40 is represented by $2(n-1)$, where n represents the number of battery cells 1 constituting battery assembly 100.

Therefore, a relational expression of $F > 9.8 \times 10 \cdot 2(n-1) \cdot M = 196(n-1)M$ is desirably satisfied, where F represents a load with which pressing member 50 presses first movable bus bar 20 and second movable bus bar 40 and M represents a weight of first movable bus bar 20 and second movable bus bar 40.

A function and effect of the present embodiment will now be described.

As shown in FIGS. 7 to 9, battery assembly 100 in the present embodiment includes fixed bus bar 10 connected to any of terminals 4 and 5. As shown in FIGS. 14 and 15, battery assembly 100 includes first movable bus bar 20 movable in directions toward and away from lid portion 3 of battery cell 1. As shown in FIGS. 22 to 25, battery assembly 100 includes second movable bus bar 40 movable in directions toward and away from lid portion 3 of battery cell 1.

As shown in FIGS. 29 to 31, a plurality of battery cells 1 are connected in series while first movable bus bar 20 is in contact with fixed bus bars 10 and second movable bus bar 40 is in non-contact with fixed bus bars 10. As shown in FIGS. 26 to 28, the plurality of battery cells 1 are connected in parallel while second movable bus bar 40 is in contact with fixed bus bars 10 and first movable bus bar 20 is in non-contact with fixed bus bars 10.

Thus, by switching between contact and non-contact of first movable bus bar 20 and second movable bus bar 40 with fixed bus bar 10, a plurality of battery cells 1 can be connected as being switched between connection in series and connection in parallel. As first movable bus bar 20 and second movable bus bar 40 vertically move with respect to battery cells 1, switching between connection in series and connection in parallel in battery assembly 100 is made. Since there is no member moving in the direction of disposition of battery cells 1, a space other than a space corresponding to a two-dimensional shape of battery assembly 100 is unnecessary, and an apparatus for switching between connection in series and connection in parallel among the plurality of battery cells 1 can achieve space conservation.

As shown in FIGS. 7 to 9, fixed bus bar 10 has flat portion 12 in a form of a flat plate and protruding portions 14 and 17 protruding from flat portion 12 in a direction away from battery cell 1. Flat portion 12 has first fixed-side contact portion 13 which can be in contact with first movable bus bar 20. Protruding portion 14 has second fixed-side contact portion 16 which can be in contact with second movable bus bar 40. Protruding portion 17 has second fixed-side contact portion 19 which can be in contact with second movable bus bar 40.

Thus, a distance between first fixed-side contact portion 13 and lid portion 3 of battery cell 1 and a distance between second fixed-side contact portions 16 and 19 and lid portion 3 of battery cell 1 can be different from each other. Thus, first movable bus bar 20 and second movable bus bar 40 movable in directions toward and away from lid portion 3 can be moved in the same direction and switching between contact and non-contact of first movable bus bar 20 and second movable bus bar 40 with fixed bus bar 10 can be made.

As shown in FIGS. 14 and 15, first movable bus bar 20 has first expansion and contraction portion 25 which can expand and contract and first movable-side contact portion 23 movable in a direction toward or away from fixed bus bar 10 with expansion or contraction of first expansion and contraction portion 25. Thus, by applying force of expansion and contraction of first expansion and contraction portion 25 to first movable bus bar 20, switching between contact and non-contact of first movable bus bar 20 with fixed bus bar 10 can readily be made.

As shown in FIG. 14, first expansion and contraction portion 25 biases first movable-side contact portion 23 in a direction away from flat portion 12 of fixed bus bar 10. Thus, first movable bus bar 20 can be brought in contact with fixed bus bar 10 by applying force in a direction of contraction of first expansion and contraction portion 25 to first movable bus bar 20, and fixed bus bar 10 and first movable bus bar 20 can be in non-contact with each other by removing the force.

As shown in FIGS. 14 and 15, first expansion and contraction portion 25 is a spring. Thus, first expansion and contraction portion 25 for moving first movable-side contact portion 23 can be realized with a simplified construction.

As shown in FIGS. 22 to 25, second movable bus bar 40 has second expansion and contraction portion 45 which can expand and contract and second movable-side contact portions 42 and 44 movable in directions toward and away from fixed bus bar 10 with expansion and contraction of second expansion and contraction portion 45. Thus, by applying force of expansion and contraction of second expansion and contraction portion 45 to second movable bus bar 40, switching between contact and non-contact of second movable bus bar 40 with fixed bus bar 10 can readily be made.

As shown in FIGS. 22 and 23, second expansion and contraction portion 45 biases second movable-side contact portions 42 and 44 in a direction toward protruding portions 14 and 17 of fixed bus bar 10. Thus, fixed bus bar 10 and second movable bus bar 40 can be in non-contact with each other by applying force in a direction of contraction of second expansion and contraction portion 45 to second movable bus bar 40, and second movable bus bar 40 can be brought in contact with fixed bus bar 10 by removing the force.

As shown in FIGS. 22 to 25, second expansion and contraction portion 45 is a spring. Thus, second expansion and contraction portion 45 for moving second movable-side contact portions 42 and 44 can be realized with a simplified construction.

A relational expression of $kL>98m$ is satisfied, where k represents a spring constant of second expansion and contraction portion 45, L represents a distance from second movable-side contact portions 42 and 44 to second fixed-side contact portions 19 and 16 of protruding portions 17 and 14, and m represents a mass of second movable bus bar 40. Thus, since contact between second movable-side contact portions 42 and 44 and second fixed-side contact portions 19 and 16 can be maintained even when vibration 10 times as great as acceleration of gravity occurs in battery assembly 100, unexpected breakage of connection in parallel in battery assembly 100 can be suppressed.

As shown in FIGS. 36 to 39, pressing member 50 presses first movable bus bar 20 and second movable bus bar 40 in a direction toward lid portion 3 of battery cell 1. Thus, switching between contact and non-contact of first movable bus bar 20 and second movable bus bar 40 with fixed bus bar 10 can reliably and simultaneously be made. Therefore, smoother switching between connection in series and connection in parallel in battery assembly 100 can be made.

A relational expression of $F>196(n-1)M$ is satisfied, where F represents a load with which pressing member 50 presses first movable bus bar 20 and second movable bus bar 40, n represents the number of battery cells 1, and M represents a weight of first movable bus bar 20 and second movable bus bar 40. Thus, even when vibration 10 times as great as acceleration of gravity occurs in battery assembly 100, a state that pressing member 50 presses first movable bus bar 20 can be kept and contact between first movable-side contact portions 23 and first fixed-side contact portions 13 can be maintained. Therefore, unexpected breakage of connection in series in battery assembly 100 can be suppressed.

According to the method of switching connection in battery assembly 100 in the present embodiment, a plurality of battery cells 1 are connected in series by bringing first movable bus bar 20 in contact with fixed bus bar 10 and not allowing contact of second movable bus bar 40 with fixed bus bar 10. A plurality of battery cells 1 are connected in parallel by bringing second movable bus bar 40 in contact with fixed bus bar 10 and not allowing contact of first movable bus bar 20 with fixed bus bar 10.

Thus, by switching between contact and non-contact of first movable bus bar 20 and second movable bus bar 40 with fixed bus bar 10, a plurality of battery cells 1 can be connected as being switched between connection in series and connection in parallel. As first movable bus bar 20 and second movable bus bar 40 vertically move with respect to battery cells 1, switching between connection in series and connection in parallel in battery assembly 100 is made. Since there is no member moving in a direction of disposition of battery cells 1, a space other than a space corresponding to a two-dimensional shape of battery assembly 100 is unnecessary, and switching between connection in series and connection in parallel among the plurality of battery cells 1 can be made with a space being conserved.

In the description so far, an example in which first movable bus bar 20 and second movable bus bar 40 move with deformation of first expansion and contraction portion 25 and second expansion and contraction portion 45 implemented by springs has been described. First expansion and contraction portion 25 and second expansion and contraction portion 45 are not limited to springs, and any member may be employed so long as the member can elastically deform and can bias first movable-side contact portion 23 and second movable-side contact portions 42 and 44.

As a construction for allowing movement of first movable bus bar 20 and second movable bus bar 40, the construction may be such that an actuator is provided in place of first expansion and contraction portion 25 and second expansion and contraction portion 45 and the actuator moves first movable-side contact portion 23 and second movable-side contact portions 42 and 44 to thereby switch between contact and non-contact of first movable bus bar 20 and second movable bus bar 40 with fixed bus bar 10.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A battery assembly in which a plurality of battery cells are connected as being switched between connection in series and connection in parallel, said battery cell having a lid portion in a form of a flat plate and a positive electrode terminal and a negative electrode terminal protruding from said lid portion to outside of said battery cell, comprising:
    a fixed bus bar connected to any of said positive electrode terminal and said negative electrode terminal, the fixed bus bar has a flat portion in a form of a flat plate and a protruding portion protruding from the flat portion in a direction away from said battery cell; and
    a first movable bus bar and a second movable bus bar movable in directions toward and away from said lid portion in a direction of thickness of said lid portion,
    the first movable bus bar has a first expansion and contraction spring which can expand and contract and a first movable-side contact portion movable in directions toward and away from the fixed bus bar with expansion and contraction of the first expansion and contraction spring, the first expansion and contraction spring biases the first movable-side contact portion in a direction away from the flat portion;
    the second movable bus bar has a second expansion and contraction spring which can expand and contract and a second movable-side contact portion movable in directions toward and away from the fixed bus bar with expansion and contraction of the second expansion and contraction spring, the second expansion and contraction spring biases the second movable-side contact portion in a direction toward the protruding portion;
    said plurality of battery cells being connected in series while said first movable bus bar is in contact with said fixed bus bar and said second movable bus bar is in non-contact with said fixed bus bar and said plurality of battery cells being connected in parallel while said second movable bus bar is in contact with said fixed bus bar and said first movable bus bar is in non-contact with said fixed bus bar.

2. The battery assembly according to claim 1, wherein said first movable bus bar moves in the direction toward said lid portion and is in contact with said flat portion and said second movable bus bar moves in the direction away from said lid portion and is in contact with said protruding portion.

3. The battery assembly according to claim 1, wherein the battery assembly is configured to satisfy a relational expression of $kL>98m$, where k represents a spring constant of said second expansion and contraction portion, L represents a distance from said second movable-side contact portion to said protruding portion, and m represents a weight of said second movable bus bar.

4. The battery assembly according to claim 1, further comprising a pressing member pressing said first movable bus bar and said second movable bus bar in the direction toward said lid portion.

5. The battery assembly according to claim 4, wherein
    the battery assembly is configured to satisfy a relational expression of $F>196(n-1)M$, where F represents a load with which said pressing member presses said first movable bus bar and said second movable bus bar, n represents the number of said battery cells, and M represents a weight of said first movable bus bar and said second movable bus bar.

6. A method of switching connection in a battery assembly, for connecting a plurality of battery cells as switching between connection in series and connection in parallel, said battery cell having a lid portion in a form of a flat plate and a positive electrode terminal and a negative electrode terminal protruding from said lid portion to outside of said battery cell, said battery assembly having a fixed bus bar connected to any of said positive electrode terminal and said negative electrode terminal, and a first movable bus bar and a second movable bus bar movable in directions toward and away from said lid portion in a direction of thickness of said lid portion,
    the fixed bus bar has a flat portion in a form of a flat plate and a protruding portion protruding from the flat portion in a direction away from said battery cell,
    the first movable bus bar has a first expansion and contraction spring which can expand and contact and a first movable-side contact portion movable in directions toward and away from the fixed bus bar with expansion and contraction of the first expansion and contraction spring, the first expansion and contraction spring biases the first movable-side contact portion in a direction away from the flat portion;
    the second movable bus bar has a second expansion and contraction spring which can expand and contract and a second movable-side contact portion movable in directions toward and away from the fixed bus bar with expansion and contraction of the second expansion and contraction spring, the second expansion and contraction spring biases the second movable-side contact portion in a direction toward the protruding portion; the method comprising:
    connecting said plurality of battery cells in series by moving said first movable bus bar in the direction toward said lid portion and bringing said first movable bus bar in contact with said fixed bus bar and not allowing contact of said second movable bus bar with said fixed bus bar, and
    connecting said plurality of battery cells in parallel by moving said second movable bus bar in the direction away from said lid portion and bringing said second movable bus bar in contact with said fixed bus bar and not allowing contact of said first movable bus bar with said fixed bus bar.

* * * * *